(12) United States Patent
Seki

(10) Patent No.: US 9,376,996 B2
(45) Date of Patent: Jun. 28, 2016

(54) ENGINE DEVICE

(75) Inventor: Yoshiaki Seki, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 274 days.

(21) Appl. No.: 14/122,478

(22) PCT Filed: Feb. 28, 2012

(86) PCT No.: PCT/JP2012/054964
§ 371 (c)(1),
(2), (4) Date: Nov. 26, 2013

(87) PCT Pub. No.: WO2012/172835
PCT Pub. Date: Dec. 20, 2012

(65) Prior Publication Data
US 2014/0077004 A1 Mar. 20, 2014

(30) Foreign Application Priority Data

Jun. 16, 2011 (JP) ................................ 2011-134316

(51) Int. Cl.
*B60T 7/12* (2006.01)
*F02M 61/16* (2006.01)
*F02D 41/02* (2006.01)
*F02D 41/40* (2006.01)
*F02D 29/00* (2006.01)
*E02F 9/20* (2006.01)

(52) U.S. Cl.
CPC ............. *F02M 61/16* (2013.01); *F02D 41/021* (2013.01); *F02D 41/022* (2013.01); *F02D 41/403* (2013.01); *E02F 9/2066* (2013.01); *F02D 29/00* (2013.01); *F02D 41/029* (2013.01); *F02D 41/405* (2013.01); *F02D 2200/101* (2013.01); *Y02T 10/44* (2013.01)

(58) Field of Classification Search
CPC .................................................. F02M 55/025
USPC ................... 701/103, 104; 123/434, 681, 456
See application file for complete search history.

(56) References Cited

U.S. PATENT DOCUMENTS

| 6,240,721 B1* | 6/2001 | Ito ......................... F02D 41/024 123/295 |
| 6,491,018 B1* | 12/2002 | Duffy ................. F02D 41/3035 123/295 |
| 6,962,140 B1* | 11/2005 | Nakai ................. F02D 41/1498 123/436 |

(Continued)

FOREIGN PATENT DOCUMENTS

| EP | 1 512 860 | 3/2005 |
| EP | 1 741 911 | 1/2007 |
| JP | 2-099753 | 4/1990 |
| JP | 9-042015 | 2/1997 |
| JP | 10-009033 | 1/1998 |
| JP | 2001-020796 | 1/2001 |
| JP | 2009-013933 | 1/2009 |
| JP | 2010-209809 | 9/2010 |

*Primary Examiner* — John Kwon
(74) *Attorney, Agent, or Firm* — Jordan and Koda PLLC

(57) ABSTRACT

A problem exists that in the case that a prior injection (a pilot injection B or a previous injection C) before a main injection A is executed when an engine is driven at a low load, a defective ignition and a defective combustion tend to be caused, an amount of carbon monoxide (CO) in an exhaust gas becomes excessive, and the carbon monoxide is discharged as white smoke. An engine device is mounted to a working vehicle, and a common rail type fuel injection device which injects fuel to the engine at multiple stages during one combustion cycle. The common rail type fuel injection device does not execute the prior injections B and C coming before the main injection A in the case that a load applied to the engine is in a low load state in which a load is lower than that at a working time by the working vehicle.

2 Claims, 14 Drawing Sheets

(56) References Cited

U.S. PATENT DOCUMENTS

| | | | |
|---|---|---|---|
| 2002/0195081 A1* | 12/2002 | McGee | F02D 41/045 123/299 |
| 2003/0164166 A1* | 9/2003 | Takeuchi | F02D 41/0085 123/674 |
| 2005/0044845 A1 | 3/2005 | Inodera et al. | |
| 2005/0092303 A1* | 5/2005 | Oki | F02D 41/0087 123/480 |
| 2006/0000446 A1* | 1/2006 | Ricco | F02D 41/3845 123/446 |
| 2007/0213919 A1 | 9/2007 | Magarida et al. | |
| 2009/0038589 A1* | 2/2009 | Dingle | F02D 41/3827 123/480 |

* cited by examiner (a) High load state of first example (b) Low load state of first example (c) High load state of second example (d) Low load state of second example

ENGINE DEVICE

TECHNICAL FIELD

The present invention relates to an engine device which is mounted to a working vehicle, for example, an agricultural machine and a construction machine.

BACKGROUND OF THE INVENTION

In a diesel engine (hereinafter, refer simply to as an engine) in recent years, there has been known a technique which achieves a reduction of nitrogen oxide (NOx) discharged from the engine, and a reduction of a noise and a vibration of the engine, by supplying a high-pressure fuel to an injection in relation to each of cylinders while utilizing a common rail type fuel injection device, and electronically controlling an injection pressure, an injection timing and an injection period of the fuel from each of the injectors (refer to Patent Documents 1 and 2).

CITATION LIST

Patent Literature

Patent Document 1: Japanese Unexamined Patent Application Publication No. 10-9033
Patent Document 2: Japanese Unexamined Patent Application

SUMMARY OF THE INVENTION

In the meantime, in the case that an engine with a common rail type fuel injection device is employed in a prime mover (a drive source) of a working vehicle, for example, an agricultural machine and a construction machine, there is a case that the engine is driven in a comparatively low load state. As the state in which the engine is in the low load, for example, there are a state in which the working vehicle is in a stop state, and a state in which a power transmission connecting and disconnecting main clutch is turned off.

However, in the case that a prior injection (a pilot injection or a previous injection) coming before a main injection is executed by the common rail type fuel injection device, when the engine is driven under the low load, there has been a problem that a defective ignition and a defective combustion tend to be caused, an amount of carbon monoxide (CO) in an exhaust gas becomes excessive, and the carbon monoxide is discharged as white smoke to an external portion. Particularly, in the case that the engine is driven under the low load at a high idle rotating speed (a high speed rotation and a low load drive), the white smoke is significantly generated.

Accordingly, a technical object of the present invention is to provide an engine device which dissolves the problem mentioned above.

An engine device according to a first aspect of the invention is provided with an engine being mounted to a working vehicle, and a common rail type fuel injection device for injecting fuel to the engine at multiple stages during one combustion cycle, and the common rail type fuel injection device does not execute a prior injection before a main injection in the case that a load applied to the engine is in a low load state in which a load is lower than a load that at a working time by the working vehicle.

According to a second aspect of the invention, there is provided the engine device as described in the first aspect of the invention, wherein the common rail type fuel injection device executes the prior injection in the case that the load applied to the engine is in the other state than the low load state.

According to a third aspect of the invention, there is provided the engine device as described in the first aspect of the invention, further including a main clutch for connecting and disconnecting power transmission from the engine, wherein the common rail type fuel injection device does not execute the prior injection in the case that the main clutch is in a power disconnection state.

According to a fourth aspect of the invention, there is provided the engine device as described in the third aspect of the invention, further including connection and disconnection detecting means adopted to detect the power connection and disconnection state of the main clutch, wherein the common rail type fuel injection device decides whether or not the prior injection can be executed based on a result of detection of the connection and disconnection detecting means.

According to a fifth aspect of the invention, there is provided the engine device as described in the fourth aspect of the invention, further including rotating speed detecting means adopted to detect an engine rotating speed, wherein the common rail type fuel injection device does not execute the prior injection in the case that the connection and disconnection detecting means detects the power disconnection state of the main clutch and the engine rotating speed detected by the rotating speed detecting means is equal to or higher than a predetermined rotating speed.

According to a sixth aspect of the invention, there is provided the engine device as described in the first and second aspects of the invention, further including injection amount detecting means adopted to detect an injection amount of the common rail type fuel injection device, wherein the common rail type fuel injection device decides whether or not the prior injection can be executed, based on a result of detection of the injection amount detecting means.

An engine device according to a seventh aspect of the invention is provided with an engine being mounted to a working vehicle, and a common rail type fuel injection device for injecting fuel to the engine at multiple stages during one combustion cycle, and the common rail type fuel injection device makes an injection amount of a prior injection before a main injection less than a previously set prescribed amount in the case that a load applied to the engine is in a low load state in which a load is lower than that at a working time by the working vehicle.

According to an eighth aspect of the invention, there is provided the engine device as described in the seventh aspect of the invention, wherein the common rail type fuel injection device sets an injection amount of the prior injection to the prescribed amount in the case that the load applied to the engine is in the other state than the low load state.

On the basis of the engine device according to the first aspect of the invention, the engine device is provided with the engine which is mounted to the working vehicle, and the common rail type fuel injection device which injects the fuel to the engine at the multiple stages during one combustion cycle, and the common rail type fuel injection device does not execute the prior injection before the main injection in the case that the load applied to the engine is in the low load state in which a load is lower than that at the working time by the working vehicle. Accordingly, in the case that the engine is driven under the low load, it is possible to reduce a risk of causing the defective ignition and the defective combustion by omitting the prior injection regardless of the engine rotating speed. As a result, it is possible to reduce an amount of carbon monoxide (CO) in the exhaust gas, and to avoid the problem that the white smoke is generated in the case that the engine is driven under the low load.

According to the second aspect of the invention, the common rail type fuel injection device executes the prior injection in the case that the load applied to the engine is in the other state than the low load state. Accordingly, it is possible to inhibit the white smoke from being generated in the case that the engine is driven under the low load, and also to secure an effect that the NOx and the noise which are caused by the prior injection can be lowered.

According to the third aspect of the invention, the engine device is further provided with the main clutch which connects and disconnects the power transmission from the engine, and the common rail type fuel injection device does not execute the prior injection in the case that the main clutch is in the power disconnection state. Accordingly, it is possible to easily prevent the problem that the white smoke is generated in the case that the engine is driven in the low load state, on the basis of a simple control of combining the power connection and disconnection state of the main clutch and possibility of the prior injection.

According to the fourth aspect of the invention, the engine device is further provided with the connection and disconnection detecting means which detects the power connection and disconnection state of the main clutch, and the common rail type fuel injection device decides whether or not the prior injection can be executed based on the result of detection of the connection and disconnection detecting means. In this case, the power disconnecting operation of the main clutch is executed by an operator on the working vehicle operating an operating means like, for example, a clutch pedal. It is understood that a change of an engine sound and an engine drive feeling are caused by whether or not the prior injection is executed, however, the change is generated by the operation by the operator. Therefore, an uncomfortable feeling is not given to the operator.

According to the fifth aspect of the invention, the engine device is further provided with the rotating speed detecting means which detects the engine rotating speed, and the common rail type fuel injection device does not execute the prior injection in the case that the connection and disconnection detecting means detects the power disconnection state of the main clutch and the engine rotating speed detected by the rotating speed detecting means is equal to or higher than the predetermined rotating speed. Accordingly, it is possible to accurately inhibit the prior injection at the high speed rotation and low load driving time which tend to cause the defective ignition and the defective combustion by executing the prior injection, in the engine, and it is possible to securely suppress the amount of the carbon monoxide (CO) in the exhaust gas. Therefore, the effect of preventing the white smoke from being generated at the high speed rotation and low load driving time of the engine is high.

According to the sixth aspect of the invention, the engine device is further provided with the injection amount detecting means which detects the injection amount of the common rail type fuel injection device, and the common rail type fuel injection device decides whether or not the prior injection can be executed based on the result of detection of the injection amount detecting means. Accordingly, the prior injection can be executed or not be executed appropriately in correspondence to the load state of the engine, and it is possible to accurately prevent the defective ignition and the defective combustion and to securely cope with the problem that the white smoke is generated in the case that the engine is driven under the low load.

On the basis of the engine device according to the seventh aspect of the invention, the engine device is provided with the engine which is mounted to the working vehicle, and the common rail type fuel injection device which injects the fuel to the engine at the multiple stages during one combustion cycle, and the common rail type fuel injection device makes the injection amount of the prior injection before the main injection less than the previously set prescribed amount in the case that the load applied to the engine is in the low load state in which a load is lower than that at the working time by the working vehicle. Accordingly, in the case that the engine is driven under the low load, it is possible to reduce the risk of causing the defective ignition and the defective combustion by reducing the injection amount of the prior injection regardless of the engine rotating speed. As a result, it is possible to reduce the amount of the carbon monoxide (CO) in the exhaust gas and to avoid the problem that the white smoke is generated in the case that the engine is driven under the low load, in the same manner as the case of the first aspect of the invention.

According to the eighth aspect of the invention, the common rail type fuel injection device sets the injection amount of the prior injection to the prescribed amount in the case that the load applied to the engine is in the other state than the low load state. Accordingly, it is possible to inhibit the white smoke from being generated in the case that the engine is driven under the low load and also to secure the effect that the NOx and the noise which are caused by the prior injection can be lowered, in the same manner as the case of the second aspect of the invention.

BRIEF DESCRIPTION OF THE DRAWINGS

FIGS. 9A, 9B, 9C and 9D are views describing an injection timing of the fuel, in which FIG. 9A shows a case of a high load state of a first example, FIG. 9B shows a case of a low load state of the first example, FIG. 9C shows a case of a high load state of a second example, and FIG. 9D shows a case of a low load state of the second example;

DETAILED DESCRIPTION OF THE PREFERRED EMBODIMENTS

A description will be given below of an embodiment embodying the present invention with reference to the accompanying drawings.

(1) Outline Structure of Tractor

Figure 1:
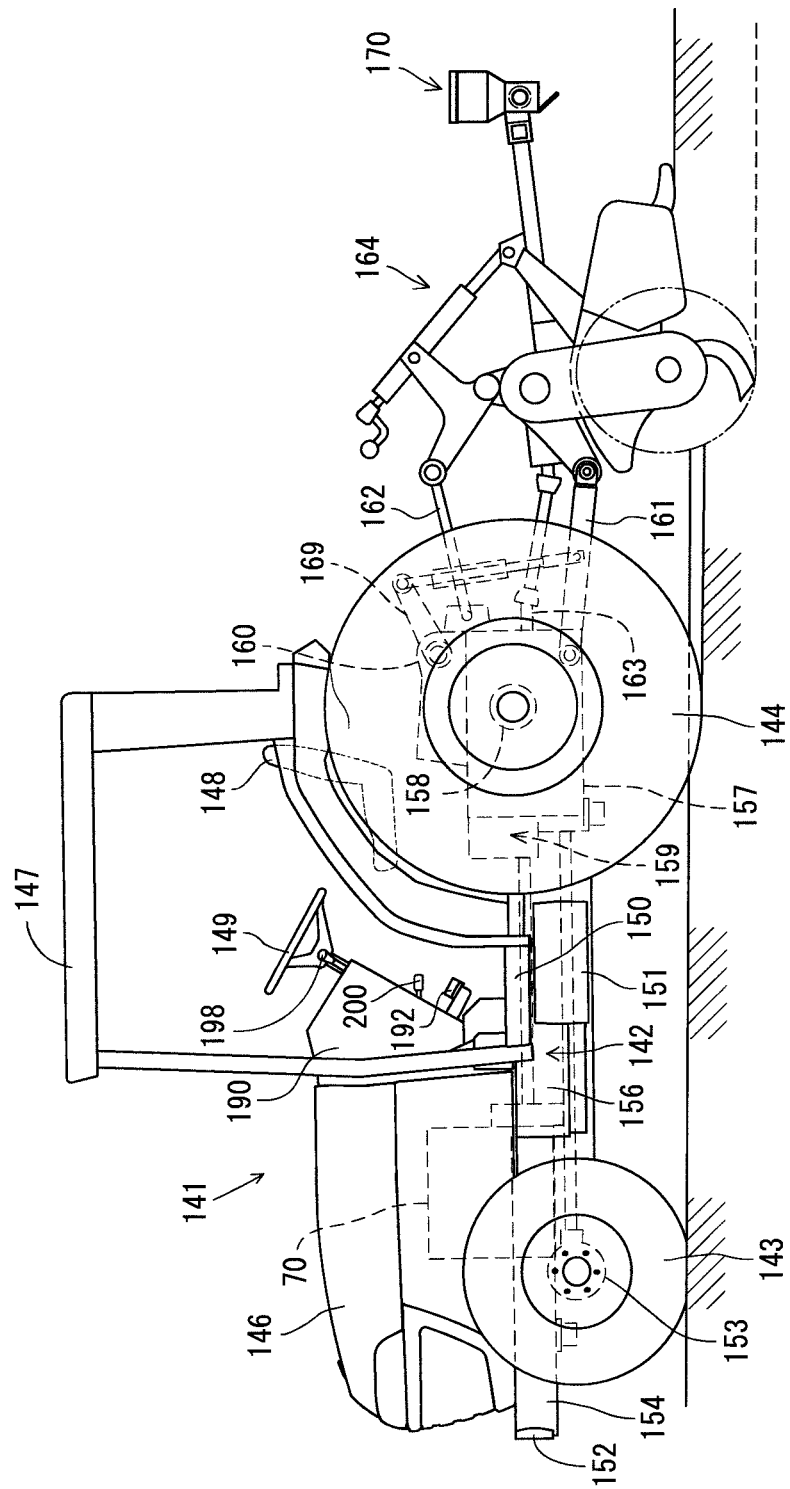
FIG. 1 is a side elevational view of a tractor.
Figure 2:
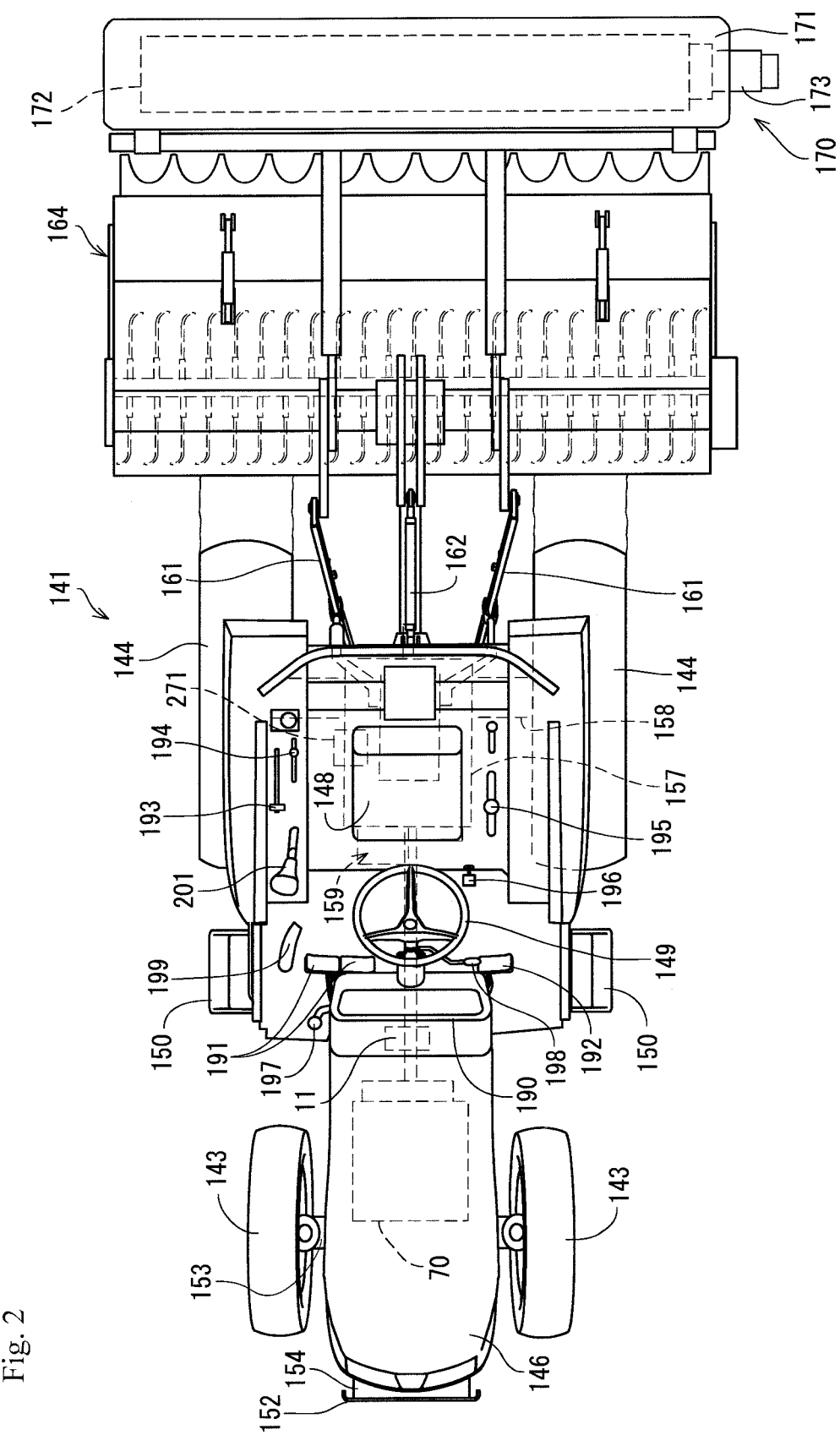
FIG. 2 is a plan view of the tractor.

First of all, a description will be given of an outline structure of a tractor 141 which is an example of a working vehicle, with reference to FIGS. 1 and 2. As shown in FIGS. 1 and 2, a travel machine body 142 of the tractor 141 is supported by a pair of right and left front wheels 143 and a pair of right and left rear wheels 144. The tractor 141 is structured such as to travel forward and backward by driving the rear wheels 144 and the front wheels 143 by an engine 70 which is mounted to a front portion of the travel machine body 142. The engine 70 is covered with a hood 146. Further, a cabin 147 is installed to a top surface of the travel machine body 142. A control seat 148 and a control steering wheel 149 are installed in an inner portion of the cabin 147, the control steering wheel 149 moving a steering direction of the front wheels 143 to right and left by steering. A step 150 by which an operator gets on and off is provided in an outer side portion of the cabin 147, and a fuel tank 151 supplying fuel to the engine 70 is provided in an inner side than the step 150 and in a lower side than a bottom portion of the cabin 147.

As shown in FIGS. 1 and 2, the control steering wheel 149 within the cabin 147 is provided on a control column 190 which is positioned in a front side of the control seat 148. A right side of the control column 190 is provided with a throttle lever 197 which sets and holds a rotating speed of the engine 70, and a pair of right and left brake pedals 191 which operates so as to brake the travel machine body 142. A left side of the control column 190 is provided with a forward and backward movement switching lever 198 for operating so as to switch a moving direction of the travel machine body 142 to a forward movement and a backward movement, and a clutch pedal 192 which operates so as to connect and disconnect a main clutch 233 mentioned later. A back surface side of the control column 190 is provided with a parking brake lever 200 which holds the brake pedal 191 at a stepped position.

In a right side of the brake pedal 191, there is arranged an accelerator pedal 199 which accelerates and decelerates a rotating speed in a range which is equal to or higher than a lower limit rotating speed which is defined by a rotating speed of the engine 70 set by the throttle lever 197. On a right column of the control seat 148, there are arranged a working machine elevating lever 193 which manually changes and adjusts a height position of a rotary tiller 164 serving as a ground working machine, a PTO transmission lever 194, and a main transmission lever 201 for operating the transmission. A sub transmission lever 195 is arranged on a left column of the control seat 148, and a differential lock pedal 196 is arranged in a front side of the left column.

As shown in FIGS. 1 and 2, the travel machine body 142 is constructed by an engine frame 154 which has a front bumper 152 and a front axle case 153, and right and left machine body frames 156 which are detachably fixed to a rear portion of the engine frame 154 by bolts. A transmission case 157 for appropriately shifting a driving force of the engine 70 so as to transmit it to the rear wheels 144 and the front wheels 143 is coupled to a rear portion of the machine body frame 156. The rear wheel 144 is attached via a rear axle case 158 which is installed so as to protrude outward from an outer side surface of the transmission case 157. A continuously variable transmission 159 (refer to FIGS. 3 and 4) which shifts the driving force from the engine 70 is provided within the transmission case 157.

A hydraulic type working machine elevating mechanism 160 moving up and down the rotary tiller 164 is detachably mounted to a rear upper surface of the transmission case 157. The rotary tiller 164 is coupled to a rear portion of the transmission case 157 via a three-point link mechanism which is constructed by a pair of right and left lower links 161 and a top link 162. A PTO shaft 163 for transmitting a PTO driving force to the rotary tiller 164 is provided in a rear side surface of the transmission case 157 so as to protrude rearward.

As shown in FIGS. 1 and 2, a seeding machine 170 for broadcast sowing is attached to a rear portion side of the rotary tiller 164 so as to be replaceable with a fertilizer distributor (not shown). The seeding machine 170 is provided with a tank 171 which accommodates seeds, a feeding portion 172 which feeds the seeds in the tank 171 every fixed amounts, and an electric motor 173 which drives a feeding roller (not shown) of the feeding portion 172. The seeds in the tank 171 are broadcast sown onto the tilled ground at the back of the rotary tiller 164 from the feeding portion 172. In the case that the fertilizer is attached to the rotary tiller 164, fertilizers (medical agents) of the fertilizer distributor are distributed onto the tilled ground at the back of the rotary tiller 164.

(2) Hydraulic Circuit Structure of Tractor

Figure 3:
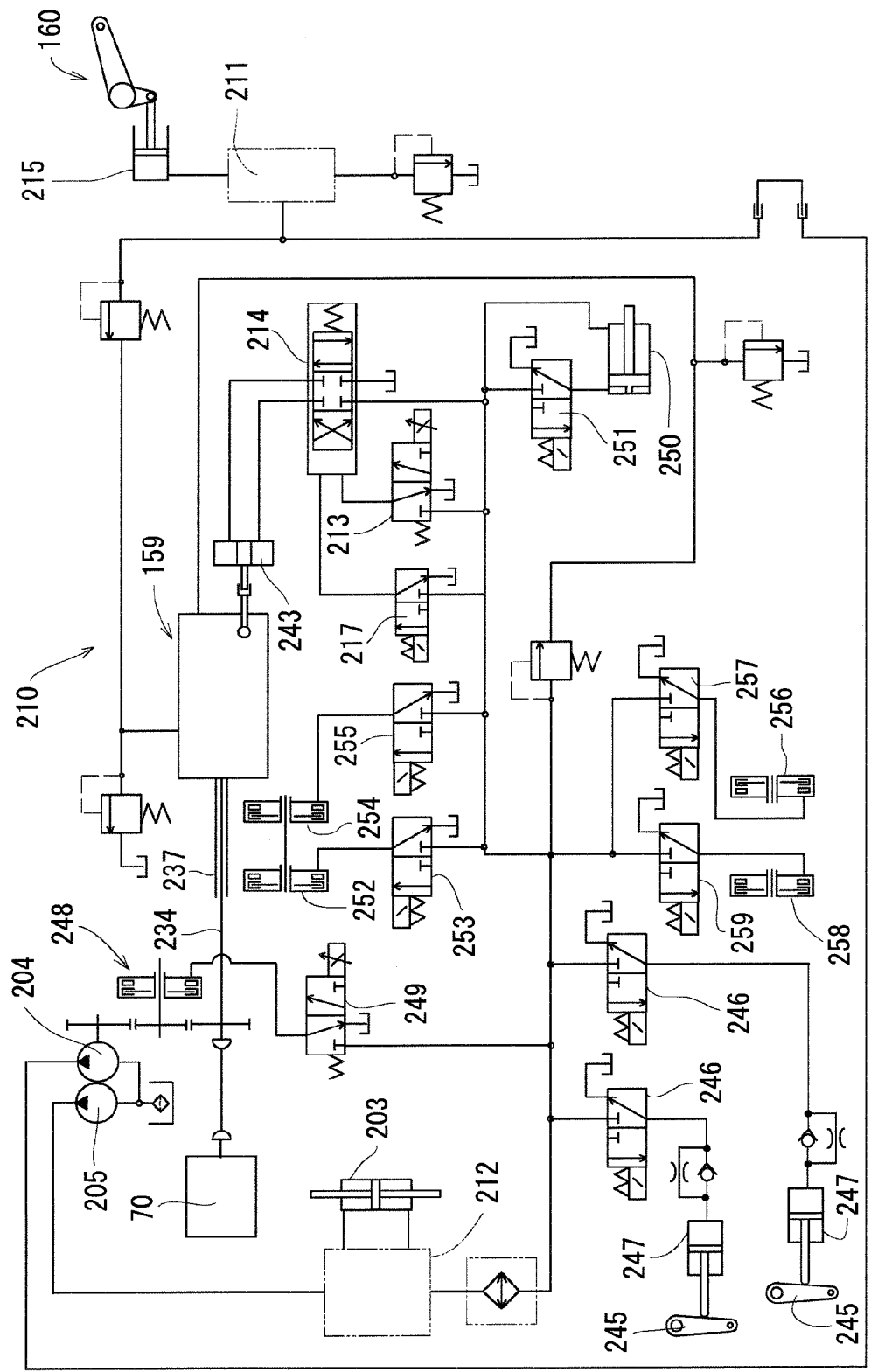
FIG. 3 is a hydraulic circuit diagram of the tractor.

Next, a description will be given of a structure of a hydraulic circuit 210 of the tractor 141 mainly with reference to FIG. 3. The hydraulic circuit 210 of the tractor 141 is provided with a working hydraulic pump 204 and a traveling hydraulic pump 205 which are driven by a rotary power of the engine 70. The working hydraulic pump 204 and the traveling hydraulic pump 205 are provided in a front surface side of a front side wall member 222 in the transmission case 157 (refer to FIG. 4). The working hydraulic pump 204 is connected to a control electromagnetic valve 211 for supplying an operating oil to an elevation control hydraulic cylinder 215 of the working machine elevating mechanism 160. The control electromagnetic valve 211 is structured such that the control electromagnetic valve can be selectively actuated on the basis of an operation of the working machine elevating lever 193. In the case that the control electromagnetic valve 211 is selectively actuated by the working machine elevating lever 193, the elevation control hydraulic cylinder 215 is driven so as to be expanded and contracted, and moves up and down and rotates a lift arm 169 (refer to FIG. 1) which connects the working machine elevating mechanism 160 to the right and left lower links 161. As a result, the rotary tiller 164 is moved up and down via the lower links 161.

The traveling hydraulic pump 205 is structured such as to supply the operating oil to the continuously variable transmission 159 of the transmission case 157 and a hydraulic cylinder 203 for a power steering. In this case, the transmission case 157 is also used as an operating oil tank, and the operating oil in an inner portion of the transmission case 157 is supplied to each of the hydraulic pumps 204 and 205. The traveling hydraulic pump 205 is connected to the hydraulic cylinder 203 for the power steering via a control valve 212 for the power steering. The traveling hydraulic pump 205 is also connected to an automatic brake electromagnetic valve 246 in relation to a pair of right and left brake cylinders 247 for brake actuating mechanisms 245.

Further, the traveling hydraulic pump 205 is connected to a PTO clutch hydraulic electromagnetic valve 249 which actuates a PTO clutch 248 of a PTO transmission mechanism 228, a proportional control valve 213 and a starting electromagnetic valve 217 in relation to the continuously variable transmission 159 and a switch valve 214 which is actuated by the proportional control valve 213 and the starting electromagnetic valve 217, a high speed clutch electromagnetic valve 251 which actuates a sub transmission hydraulic cylinder 250 of a sub transmission mechanism 227, a forward moving clutch electromagnetic valve 253 in relation to a forward moving hydraulic clutch 252 of a forward and backward movement switching mechanism 226, a backward moving clutch electromagnetic valve 255 in relation to a backward moving hydraulic clutch 254, a 4-wheel drive hydraulic electromagnetic valve 257 in relation to a four-wheel driving hydraulic clutch 256 of a two-wheel/four-wheel drive switching mechanism 229, and a double speed hydraulic electromagnetic valve 259 in relation to a double speed hydraulic clutch 258.

The PTO clutch hydraulic electromagnetic valve 249, the forward moving clutch electromagnetic valve 253, the backward moving clutch electromagnetic valve 255, the 4-wheel drive electromagnetic valve 257 and the double speed hydraulic electromagnetic valve 259 are structured such as to switch and drive each of the hydraulic clutches 248, 252, 254, 256 and 258 by being appropriately controlled so as to actuate the respectively corresponding clutch cylinder. The hydraulic circuit 210 is also includes a relief valve, a flow rate adjusting valve, a check valve, an oil cooler, and an oil filter.

(3) Power Transmission System of Tractor

Figure 4:
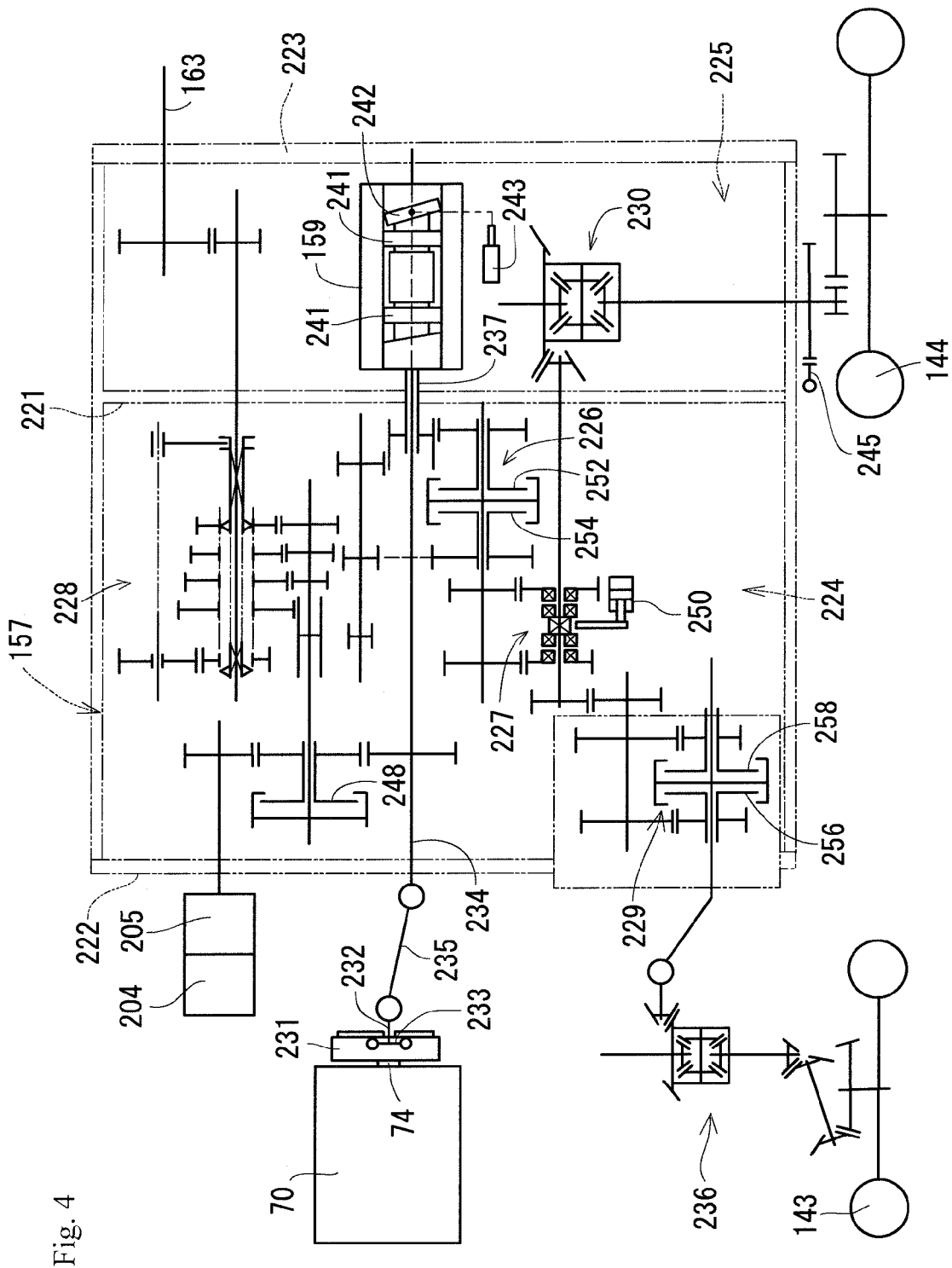
FIG. 4 is a skeleton view of a power transmission system in the tractor.

Next, a description will be given of a power transmission system of the tractor 141 mainly with reference to FIG. 4. A front side wall member 222 is detachably fixed to a front surface of the transmission case 157 which is formed as a hollow box shape, and a rear side wall member 223 is detachably fixed to a rear surface thereof. An inner portion of the transmission case 157 is separated into a front chamber 224 and a rear chamber 225 by a partition wall 221. Although an illustration will be omitted, the front chamber 224 and the rear chamber 225 are communicated in such a manner that the internal operating oil can move to each other. In the front chamber 224 side of the transmission case 157, there are arranged the forward and backward movement switching mechanism 226 which switches the rotary power from the continuously variable transmission 159 to a normal rotating direction or a reverse rotating direction, the mechanical sub transmission mechanism 227 which shifts the rotary power via the forward and backward movement switching mechanism 226, the PTO transmission mechanism 228 which appropriately shifts the rotary power from the engine 70 so as to transmit it to the PTO shaft 163, and the two-wheel/four-wheel drive switching mechanism 229 which switches the two-wheel drive and the four-wheel drive of the front and rear wheels 143 and 144. Further, in the rear chamber 225 side, there are arranged the continuously variable transmission 159, and a differential gear mechanism 230 which transmits the rotary power via the sub transmission mechanism 227 to the right and left rear wheels 144.

A flywheel 231 is attached to an engine output shaft 74 which protrudes rearward out of the engine 70 so as to be directly coupled. The flywheel 231 and a main driving shaft 232 extending rearward from the flywheel are coupled via a main clutch 233 for connecting and disconnecting power. The main driving shaft 232 and a main transmission input shaft 234 protruding forward from the transmission case 157 are coupled via a power transmission shaft 235 which is provided with universal shaft couplings in both ends. The rotary power of the engine 70 is transmitted from the engine output shaft 74 to the main transmission input shaft 234 via the main driving shaft 232 and the power transmission shaft 235, and is next approximately shifted by the continuously variable transmission 159 and the sub transmission mechanism 227. The shifted power is transmitted to the right and left rear wheels 144 via the differential gear mechanism 230. The shifted power by the continuously variable transmission 159 and the sub transmission mechanism 227 is transmitted to the right and left front wheels 143 via the two-wheel/four-wheel drive switching mechanism 229 and the differential gear mechanism 236 within the front axle case 153.

The continuously variable transmission 159 in the inner portion of the rear chamber 225 is constructed as an inline type that the main transmission output shaft 237 is concentrically arranged in the main transmission input shaft 234, and is provided with a variable displacement type hydraulic pump portion 240, and a fixed displacement type transmission hydraulic motor portion 241 which is actuated by the high-pressure operating oil discharged from the hydraulic pump portion 240. The hydraulic pump portion 240 is provided with a pump swash plate 242 whose incline angle can be changed in relation to an axis of the main transmission input shaft 234 so as to adjust a supply amount of the operating oil. A main transmission hydraulic cylinder 243 is associated with the pump swash plate 242, the main transmission hydraulic cylinder 243 changing and adjusting an angle of incline of the pump swash plate 242 in relation to the axis of the main transmission input shaft 234. The amount of the operating oil supplied to the hydraulic motor portion 241 from the hydraulic pump portion 240 is changed and adjusted by changing the angle of incline of the pump swash plate 242 on the basis of the driving of the main transmission hydraulic cylinder 243, and a main transmission motion of the continuously variable transmission 159 is carried out.

Figure 5:
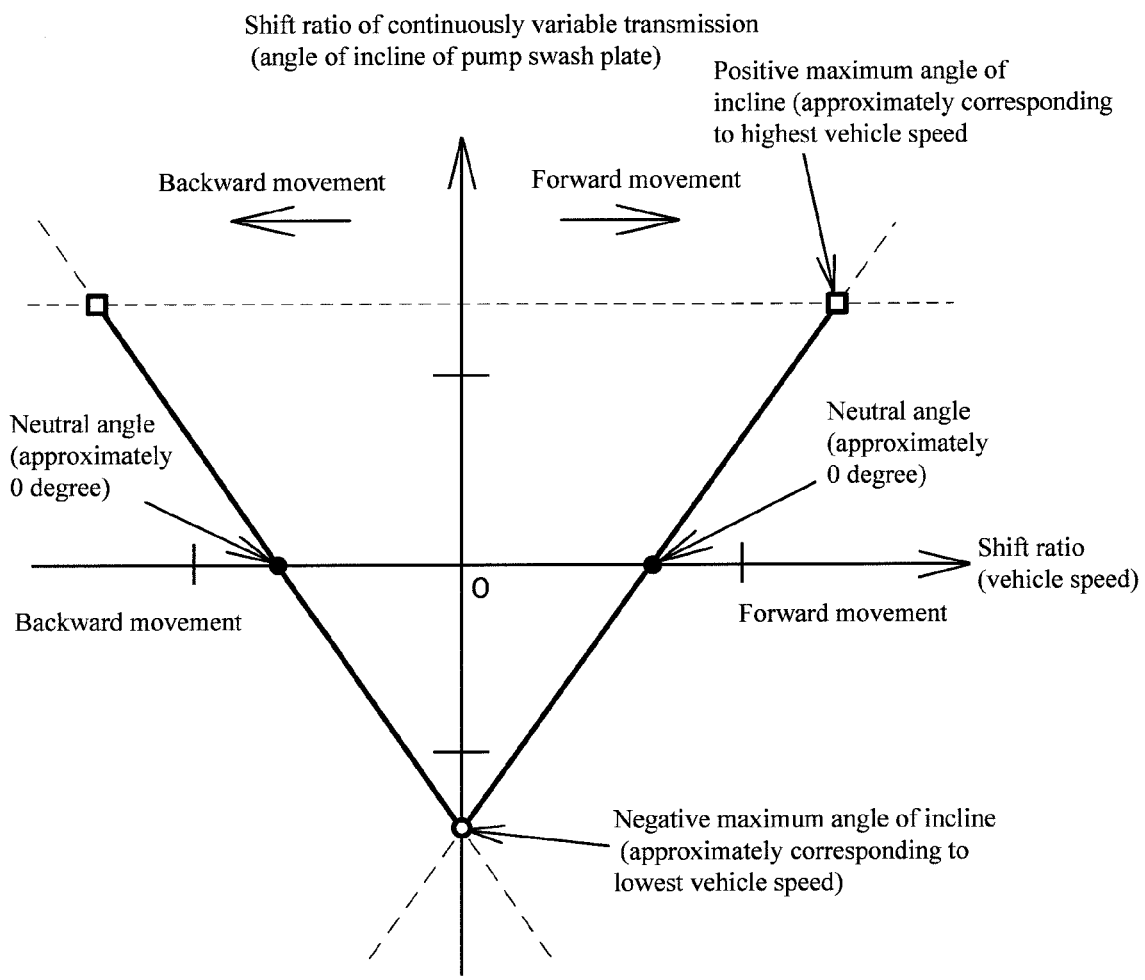
FIG. 5 is a view describing a relationship between a vehicle speed and a shift ratio of a continuously variable transmission.

In other words, in the case that the switch valve 214 is actuated by the operating oil from the proportional control valve 213 which is actuated in proportion to an operating amount of the main transmission lever 201, the main transmission hydraulic cylinder 190 is driven, and the angle of incline of the pump swash plate 242 is accordingly changed in relation to the axis of the main transmission input shaft 234. The angle of the pump swash plate 242 according to the embodiment can be adjusted in a range between one (positive) maximum angle of incline and the other (negative) maximum angle of incline with respect to a neutral angle which is approximately zero incline (zero and its vicinity), and is set to be an angle which is inclined to any one (an angle of incline which is negative and near the maximum in this case) in the case that the vehicle speed of the travel machine body 142 is the lowest (refer to FIG. 5).

In the case that the angle of incline of the pump swash plate 242 is approximately zero (the neutral angle), the hydraulic motor portion 241 is not driven by the hydraulic pump portion 240, but the main transmission output shaft 237 rotates approximately at the same rotating speed as the main transmission input shaft 234. In the case that the pump swash plate 242 is inclined to the one direction (the positive angle of incline) side in relation to the axis of the main transmission input shaft 234, the hydraulic pump portion 240 actuates the hydraulic motor portion 241 with increased speed, and the main transmission output shaft 237 rotates at a rotating speed which is higher than that of the main transmission input shaft 234. As a result, the rotating speed of the hydraulic motor portion 241 is added to the rotating speed of the main transmission input shaft 234 and transmitted to the main transmission output shaft 237. Accordingly, the transmission power (the vehicle speed) from the main transmission output shaft 237 is changed in proportion to the angle of incline (the positive angle of incline) of the pump swash plate 242, in a range of the rotating speed which is higher than the rotating speed of the main transmission input shaft 234. In the case that the pump swash plate 242 is at the angle of incline which is positive and near the maximum, the travel machine body 142 is at the maximum vehicle speed (refer to outline squares in FIG. 5).

In the case that the pump swash plate 242 is inclined to the other direction (the negative angle of incline) side in relation to the axis of the main transmission input shaft 234, the hydraulic pump portion 240 actuates so as to decelerate (reverse rotate) the hydraulic motor portion 241, and the main transmission output shaft 237 rotates at the rotating speed which is lower than that of the main transmission input shaft 234. As a result, the rotating speed of the hydraulic motor portion 241 is subtracted from the rotating speed of the main transmission input shaft 234 and transmitted to the main transmission output shaft 237. Accordingly, the transmission power from the main transmission output shaft 237 is changed in proportion to the angle of incline (the negative angle of incline) of the pump swash plate 242 in a range of the rotating speed which is lower than the rotating speed of the main transmission input shaft 234. In the case that the pump swash plate 242 is at the angle of incline which is negative and near the maximum, the travel machine body 142 is at the minimum vehicle speed (refer to an outline circle in FIG. 5).

In the embodiment, in the case that the switch valve 214 is actuated by the operating oil from the starting electromagnetic valve 217 which is actuated on the basis of a command of a working machine (transmission) controller 271 mentioned later, the main transmission hydraulic cylinder 243 is driven regardless of an operating position of the main transmission lever 201, and the angle of incline of the pump swash plate 242 in relation to the axis of the main transmission input shaft 234 is accordingly changed.

(4) Structure of Engine and Periphery Thereof

Figure 6:
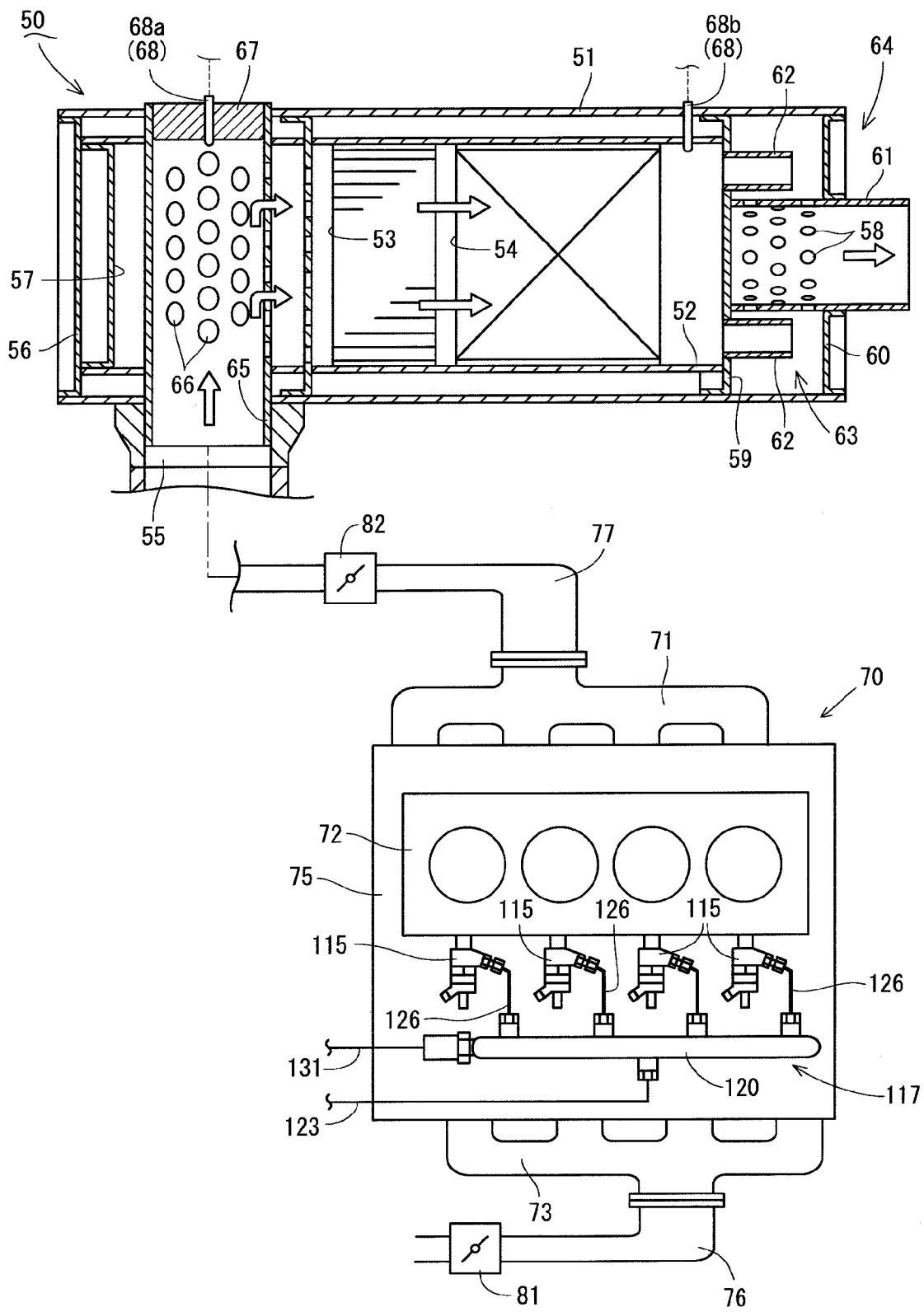
FIG. 6 is an explanatory view of a fuel system of an engine.

Next, a description will be given of a structure of the engine 70 and a periphery thereof with reference to FIGS. 6 and 7. As shown in FIG. 6, the engine 70 is a four-cylinder type diesel engine, and is provided with a cylinder block 75 in which a cylinder head 72 is fastened to its top surface. An intake manifold 73 is connected to one side surface of the cylinder head 72, and an exhaust manifold 71 is connected to the other side surface. A common rail device 117 (a common rail type fuel injection device) is provided below the intake manifold 73 in the side surface of the cylinder block 75, the common rail device 117 injecting the fuel to each of the cylinders of the engine 70 in multiple stages during one combustion cycle. An intake air throttle device 81 for adjusting an intake air pressure (an intake air amount) of the engine 70, and an air cleaner (not shown) are connected to an intake pipe 76 which is connected to an intake air upstream side of the intake manifold 73.

Figure 7:
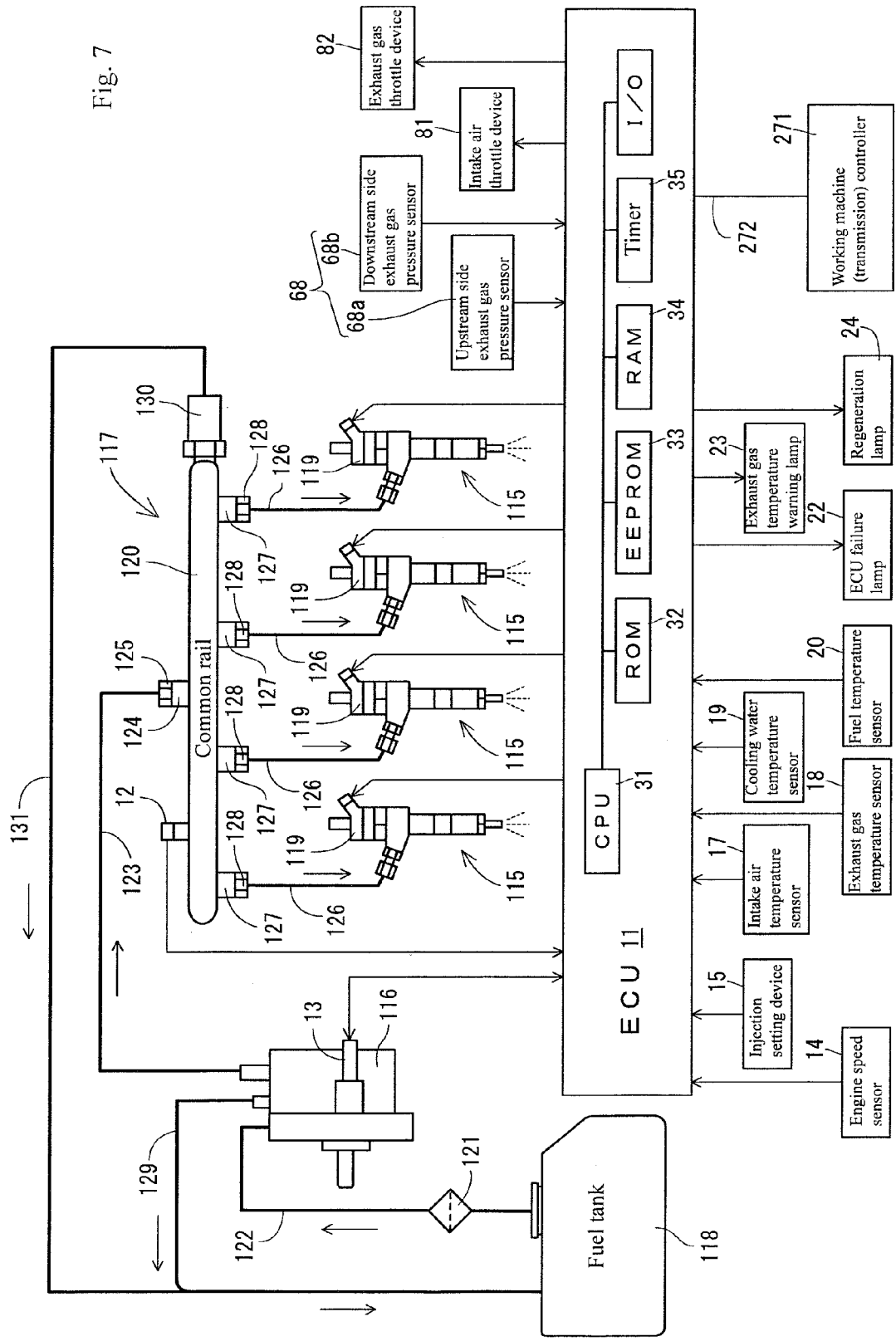
FIG. 7 is a function block diagram showing a relationship between the engine and an exhaust gas purification device.

As shown in FIG. 7, a fuel tank 118 is connected to each of injectors 115 for four cylinders via the common rail device 117 and a fuel supply pump 116. Each of the injectors 115 is provided with an electromagnetically opening and closing control type fuel injection valve 119. The common rail device 117 is provided with a cylindrical common rail 120. The fuel tank 118 is connected to an intake side of the fuel supply pump 116 via a fuel filter 121 and a low pressure pipe 122.

The fuel within the fuel tank 118 is sucked into the fuel supply pump 116 via the fuel filter 121 and the low pressure pipe 122. The fuel supply pump 116 according to the embodiment is arranged in the vicinity of the intake manifold 73. On the other hand, the common rail 120 is connected to a discharge side of the fuel supply pump 116 via a high pressure pipe 123. The injectors 115 for four cylinders are connected to the common rain 120 via four fuel injection pipes 126.

In the structure mentioned above, the fuel in the fuel tank 118 is pressure fed to the common rail 120 by the fuel supply pump 116, and the high-pressure fuel is stored in the common rail 120. Since each of the fuel injection valves 119 is controlled so as to be opened and closed, the high-pressure fuel within the common rail 120 is injected to each of the cylinders of the engine 70 from each of the injectors 115. In other words, an injection pressure, an injection timing and an injection period (an injection amount) of the fuel supplied from each of the injectors 115 are controlled at a high precision by electronically controlling each of the fuel injection valves 119. Therefore, it is possible to reduce nitrogen oxide (NOx) from the engine 70 and also to reduce the noise and the vibration of the engine 70.

Figure 9:
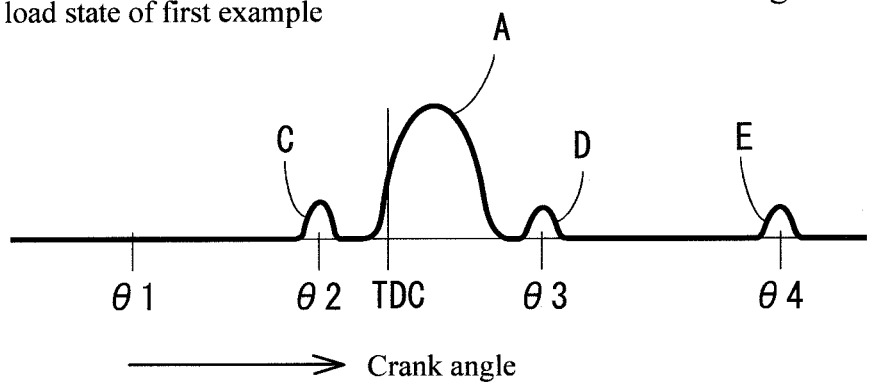
Figure 9:
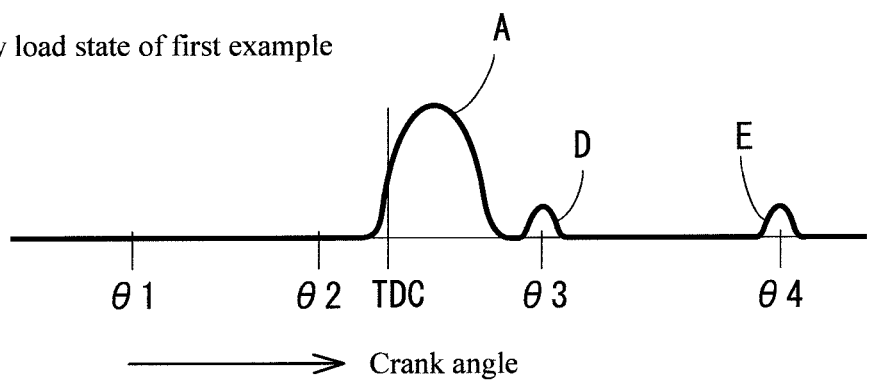
Figure 9:
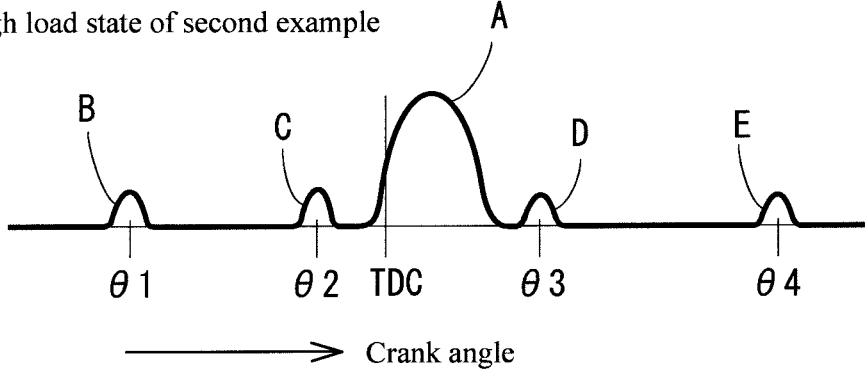
Figure 9:
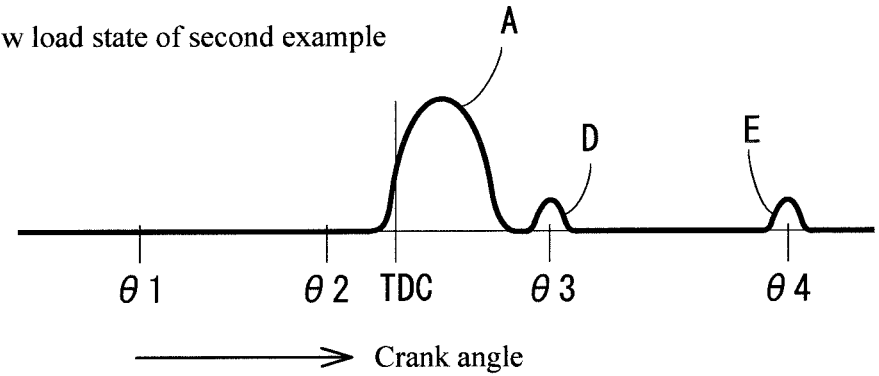

As shown in FIG. 9, the common rail device 117 is structured such as to execute a main injection A in the vicinity of a top dead center (TDC). Further, the common rail device 117 is structured such as to execute a small amount of pilot injection B for the purpose of reducing the NOx and the noise at a timing of a crank angle $\theta1$ which is about 60 degrees before the top dead center, execute a previous injection C for the purpose of reducing the noise at a timing of a crank angle $\theta2$ which is just before the top dead center, and execute an after injection D and a post injection E for the purpose of reducing a particulate matter (hereinafter, refer to as PM) and promoting purification of the exhaust gas at a timing of crank angles $\theta3$ and $\theta4$ which are after the top dead center, in addition to the main injection A.

The pilot injection B is structured such as to promote mixing of the fuel and the air by injecting at the timing which is greatly advanced in relation to the main injection A. The previous injection C is structured such as to shorten a delay of an ignition timing by the main injection A, by injecting prior to the main injection A. The after injection D is structured such as to activate a diffusion combustion and raise a temperature of the exhaust gas from the engine 70 (afterburn the PM) by injecting at a slightly delayed timing in relation to the main injection A. The post injection E is structured such as to supply the fuel as an unburned fuel to a DPF 50 mentioned later without contributing to the actual combustion process, by injecting at the timing which is greatly delayed in relation to the main injection A. The unburned fuel supplied to the DPF 50 reacts on a diesel oxidation catalyst 53 mentioned later, and the temperature of the exhaust gas within the DPF 50 is raised by a reaction heat. Roughly speaking, ups and downs in a graph in FIG. 9 express a difference of an injection amount in each of the injection stages A to E. The injections (for example, the pilot injection B and the previous injection C) prior to the main injection A are collectively called as a prior injection.

As shown in FIG. 7, the fuel supply pump 116 is connected to the fuel tank 118 via a fuel return pipe 129. A common rail return pipe 131 is connected to an end portion in a longitudinal direction of the cylindrical common rail 120 via a return pipe connector 130 which limits the pressure of the fuel within the common rail 120. In other words, a surplus fuel in the fuel supply pump 116 and a surplus fuel in the common rail 120 are recovered to the fuel tank 118 via the fuel return pipe 129 and the common rail return pipe 131.

An exhaust gas throttle device 82 and a diesel particulate filter 50 (hereinafter, refer to as DPF) are connected to an exhaust pipe 77 which is connected to an exhaust gas downstream side of the exhaust manifold 71. The exhaust gas throttle device 82 is provided for adjusting the exhaust gas pressure of the engine 70, and the DPF 50 is an example of the exhaust gas purification device. The exhaust gas discharged from each of the cylinders to the exhaust manifold 71 is discharged to the external portion after being purified through the exhaust pipe 77, the exhaust gas throttle device 82, and the DPF 50.

As shown in FIG. 6, the DPF 50 is provided for collecting the particulate matter (hereinafter, refer to as PM) in the exhaust gas. The DPF 50 according to the embodiment is structured such that a diesel oxidation catalyst 53, for example, platinum, and a soot filter 54 are accommodated in series in an approximately tubular filter case 52 within a casing 51 which is made of a heat resisting metal material. The diesel oxidation catalyst 53 is arranged in an upstream side of the exhaust gas of the filter case 52, and the soot filter 54 is arranged in a downstream side of the exhaust gas. The soot filter 54 is constructed as a honeycomb structure having a lot of cells which are comparted by a porous partition wall capable of filtering the exhaust gas.

One side portion of the casing 51 is provided with an exhaust gas introduction port 55 which is communicated with a downstream side of the exhaust gas of the exhaust gas throttle device 82 in the exhaust pipe 77. One side portion of the casing 51 and one side portion of the filter case 52 are closed by a first side wall plate 56 and a second side wall plate 57. The other side portion of the casing 51 is closed by a first lid plate 59 and a second lid plate 60. A portion between both the lid plates 59 and 60 is constructed as an exhaust gas sound damping chamber 63 which is communicated within the filter case 52 via a plurality of communication pipes 62. Further, an approximately tubular exhaust gas outlet pipe 61 passes through the second lid plate 60. A plurality of communication holes 58 which are open toward the exhaust gas sound damping chamber 63 are formed in an outer peripheral surface of the exhaust gas outlet pipe 61. A sound absorber 64 is constructed by the exhaust gas outlet pipe 61 and the exhaust gas sound damping chamber 63.

The exhaust gas introduction pipe 65 is inserted to the exhaust gas introduction port 55 which is formed in one side portion of the casing 51. A leading end of the exhaust gas introduction pipe 65 protrudes to a side surface which is opposed to the exhaust gas introduction port 55 while cutting across the casing 51. A plurality of communication holes 66 which are open toward the filter case 52 are formed in an outer peripheral surface of the exhaust gas introduction pipe 65. A portion protruding to the side surface in the opposite side to the exhaust gas introduction port 55 in the exhaust gas introduction pipe 65 is closed by a lid body 67 which is detachably screwed thereto.

A DPF differential pressure sensor 68 detecting a clogged state of the soot filter 54 is provided as one example of the detecting means, in the DPF 50. The DPF differential pressure sensor 68 is structured such as to detect a pressure difference of each of the exhaust gas pressure between the upstream side and the downstream side of the soot filter 54 within the DPF 50 (an exhaust gas differential pressure between the inlet side and the outlet side). In this case, an upstream side exhaust gas pressure sensor 68$a$ constructing the DPF differential pressure sensor 68 is installed to the lid body 67 of the exhaust gas introduction pipe 65, and a downstream side exhaust gas pressure sensor 68$b$ is installed between the soot filter 54 and the exhaust gas sound damping chamber 63.

Since a specific relevance exists between the pressure difference between the upstream and downstream sides of the DPF 50, and a PM sedimentation amount within the soot filter 54 (the DPF 50), the PM sedimentation amount within the DPF 50 can be determined by computation on the basis of the pressure difference which is detected by the DPF differential pressure sensor 68. Further, a control for regenerating the soot filter 54 (the DPF 50) is executed by controlling so as to actuate the intake air throttle device 81, the exhaust gas throttle device 82 or the common rail 120 on the basis of results of computation of the PM sedimentation amount.

In the structure mentioned above, the exhaust gas from the engine 70 enters into the exhaust gas introduction pipe 65 via the exhaust gas introduction port 55, jets out into the filter case 52 from each of the communication holes 66 which are formed in the exhaust gas introduction pipe 65, and passes through the diesel oxidation catalyst 53 and the soot filter 54 in this order so as to be purified. The PM in the exhaust gas is collected to the soot filter 54 (the porous partition walls between the cells). The exhaust gas passing through the diesel oxidation catalyst 53 and the soot filter 54 is discharged from of the exhaust gas outlet pipe 61 to the external side of the machine via the sound absorber 64.

If the exhaust gas temperature goes beyond a regenerative temperature (for example, about 250 to 300° C.) when the exhaust gas passes through the diesel oxidation catalyst 53 and the soot filter 54, the NO (the nitrogen monoxide) in the exhaust gas is oxidized to an unstable $NO_2$ (nitrogen dioxide) on the basis of an action of the diesel oxidation catalyst 53. Further, the PM collecting capacity of the soot filter 54 is restored by oxidizing and removing the PM which is piled up in the soot filter 54, by O (oxygen) which is discharged when $NO_2$ is returned to NO. In other words, the soot filter 54 (the DPF 50) is regenerated.

(5) Structure Associated with Control of Engine

Figure 8:
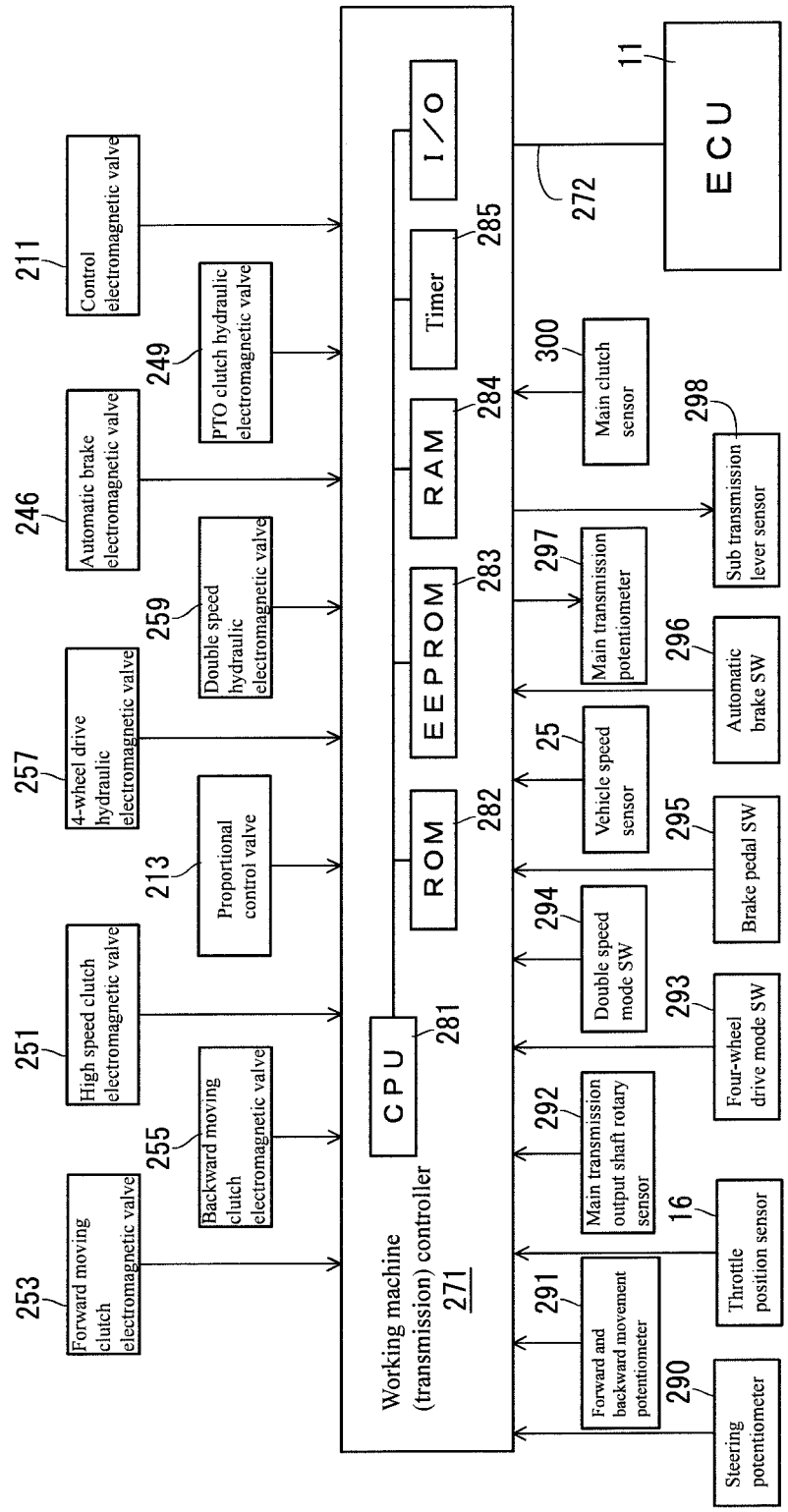
FIG. 8 is a function block diagram showing a relationship between an ECU and a transmission controller.

Next, a description will be given of a structure which is associated with a control of the engine 70 with reference to FIGS. 7 and 8. As shown in FIGS. 7 and 8, the tractor 141 is provided with an ECU 11 which actuates the fuel injection valve 119 of each of the cylinders in the engine 70, and a working machine (transmission) controller 271, as the control means. The ECU 11 has a CPU 31 which executes various computing processes and controls, a ROM 32 which previously stores various data in a stationary manner, an EEPROM 33 which stores control programs and various data in a rewritable manner, a RAM 34 which temporarily stores the control programs and the various data, a time measuring timer 35, and an input and output interface. The working machine controller 271 also has a CPU 281, a ROM 282, an EEPROM 283, a RAM 284, a timer 285, and an input and output interface, in the same manner as the ECU 11.

The ECU 11 and the working machine controller 271 which serve as the control means are aimed to be combined in a state in which a length of a harness for input and output devices is as short as possible so as to be controlled, and are stored in a control box (not shown) at their respective arranged positions. The ECU 11 and the working machine controller 271 are electrically connected to each other via a CAN communication bus 272. The ECU 11 according to the embodiment is arranged in the engine 70 or in the vicinity of the engine (refer to FIG. 2). The working machine controller 271 is arranged, for example, below the control seat 148 within the cabin 147 (refer to FIG. 2). The control means may be structured such that three or more communication means are connected via communication buses. Each of the input and output devices mentioned later may be connected to any control means.

To the input side of the ECU 11, there are connected at least a rail pressure sensor 12 which detects the fuel pressure within the common rail 120, an electromagnetic clutch 13 which rotates and stops the fuel pump 116, an engine speed sensor 14 serving as a rotating speed detecting means which detects the rotating speed of the engine 70 (a cam shaft position of the engine output shaft 74), an injection setting device 15 which detects and sets a fuel injection frequency (a frequency during a fuel injection period of one stroke) of the injector 115, an intake air temperature sensor 17 which detects a temperature of the intake gas in the intake system, an exhaust gas temperature sensor 18 which detects a temperature of the exhaust gas in the exhaust system, a cooling water temperature sensor 19 which detects a temperature of the cooling water in the engine 70, a fuel temperature sensor 20 which detects a temperature of the fuel within the common rail 120, and a DPF differential pressure sensor 68 (the upstream side exhaust gas pressure sensor 68a and the downstream side exhaust gas pressure sensor 68b).

An electromagnetic solenoid of each of the fuel injection valves 119 for four cylinders of the engine is connected to the output side of the ECU 11. In other words, since the high-pressure fuel stored in the common rail 120 is injected from the fuel injection valve 119 separately at plural times during one stroke, while controlling the fuel injection pressure, the injection timing and the injection period, it is possible to inhibit the nitrogen oxide (NOx) from being generated, to execute a complete combustion in which generation of soot and carbon dioxide is lowered, and to improve a mileage. Further, to an output side of the ECU 11, there are connected the intake air throttle device 81 for adjusting an intake air pressure (an intake air amount) of the engine 70, the exhaust gas throttle device 82 for adjusting an exhaust gas pressure of the engine 70, an ECU failure lamp 22 which gives a warning and informs of a failure of the ECU 11, an exhaust gas temperature warning lamp 23 which informs an abnormally high temperature in the exhaust gas temperature within the DPF 50, and a regeneration lamp 24 which turns on in conjunction with a regenerating action of the DPF 50.

As shown in FIG. 8, to the working machine controller 271, there are connected the various electromagnetic valves associated with the output, that is, the forward moving clutch electromagnetic valve 253 in relation to the forward moving hydraulic clutch 252, the backward moving clutch electromagnetic valve 255 in relation to the backward moving hydraulic clutch 254, the high speed clutch electromagnetic valve 251 in relation to the sub transmission hydraulic cylinder 250, the proportional control valve 213 which actuates the main transmission hydraulic cylinder 243 in proportion to the operating amount of the main transmission lever 201, the 4-wheel drive hydraulic electromagnetic valve 257 in relation to the four-wheel driving hydraulic clutch 256, the double speed hydraulic electromagnetic valve 259 in relation to the double speed hydraulic clutch 258, the right and left automatic brake electromagnetic valves 246, the PTO clutch hydraulic electromagnetic valve 249 in relation to the PTO clutch 248, and the control electromagnetic valve 211 which supplies the operating oil to the elevation control hydraulic cylinder 215 of the working machine elevating mechanism 160.

Further, to the working machine controller 271, there are connected various sensors and switches associated with the input, that is, a steering potentiometer 290 which detects an amount of rotary operation (steering angle) of the control steering wheel 149, a forward and backward movement potentiometer 291 which detects an on-off state of the forward moving and backward moving hydraulic clutches 252 and 254 on the basis of an operating position of the forward and backward movement switching lever 198, a main transmission output shaft rotary sensor 292 which detects an output rotating speed of the main transmission output shaft 237, a throttle position sensor 16 which detects an operating position of the throttle lever 197, a vehicle speed sensor 25 which detects a rotating speed (a vehicle speed) of the four front and rear wheels 143 and 144, a four-wheel drive mode switch 293 which selectively operates the 4-wheel drive hydraulic electromagnetic valve 257, a double speed mode switch 294 which selectively operates the double speed hydraulic electromagnetic valve 259, a brake pedal switch 295 which detects whether or not the brake pedal 191 is stepped down, an automatic brake switch 296 which selectively operates the automatic brake electromagnetic valve 246, a main transmission potentiometer 297 which detects an operating position of the main transmission lever 201, a sub transmission lever sensor 298 which detects an operating position of the sub transmission lever 195, and a main dutch sensor 300 serving as a connection and disconnection detecting means which detects a power connection and disconnection state of the main clutch 233. The main clutch sensor 300 may be structured such as to directly detect the power connection and disconnection state of the main clutch 233, or may be structured such as to indirectly detect the power connection and disconnection state of the main clutch on the basis of the operating position of the clutch pedal 192.

An output characteristic map (not shown) indicating a relationship between the rotating speed N and the torque T (the load) of the engine 70 is previously stored in the EEPROM 33 of the ECU 11 or the EEPROM 283 of the working machine controller 271. The ECU 11 is structured such as to determine the torque T of the engine 70 on the basis of the rotating speed which is detected by the engine speed sensor 14, and the throttle position which is detected by the throttle position sensor 16, compute a target injection amount by using the torque T and the output characteristic map, and execute a fuel injection control which actuates the common rail device 117 on the basis of the results of computation. The injection amount of the common rail device 117 is adjusted by adjusting a valve opening period of each of the fuel injection valves 119, and changing the injection period to each of the injectors 115. The ECU 11 is structured such as to calculate an actual injection amount injected by the common rail device 117 (a whole injection amount of the injector 115) on the basis of the valve opening period of each of the fuel injection valves 119 and the fuel pressure which is detected by the rail pressure sensor 12. In other words, the ECU 11 serves as the injection amount detecting means which detects the injection amount of the common rail device 117.

(6) Description of Fuel Injection Control

Next, a description will be given of a fuel injection control by the common rail device 117 with reference to a flow chart in FIG. 10. The common rail device 117 according to the embodiment is structured such as to execute a normal fuel injection control which carries out the prior injections B and C which are prior to the main injection in a high load state in which the load applied to the engine 70 is comparatively high, and a corrected injection control which does not carry out the prior injections B and C in a low load state in which the load applied to the engine 70 is lower than that of the working time by the tractor 141. The fuel injection control and the corrected injection control are executed on the basis of the command of the ECU 11. In other words, an algorithm shown by the flow chart in FIG. 10 is stored in the EEPROM 33, and the fuel injection control and the corrected injection control are executed by calling the algorithm to the RAM 34 and processing the algorithm by the CPU 31.

Figure 10:
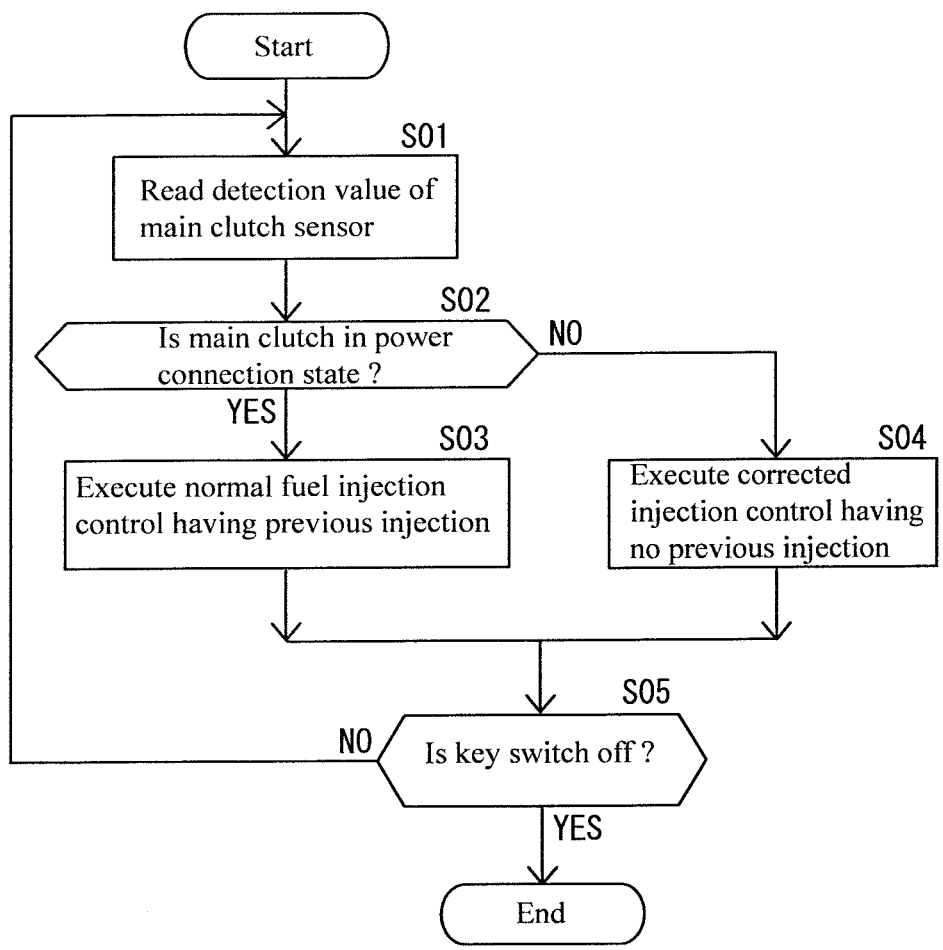
FIG. 10 is a flow chart showing a first example of a fuel injection control.

The flow chart in FIG. 10 is a first example of the fuel injection control. In the first example, the load applied to the engine 70 is discriminated on the basis of the power connection and disconnection state of the main clutch 233. Further, in the first example, only the previous injection C is employed as the prior injections B and C, and the pilot injection B is not carried out at all regardless of the level of the load to the engine 70. The normal fuel injection control (refer to FIG. 9A) with the previous injection C is executed in the case that the main clutch 233 is in the power connection state, and the corrected injection control (refer to FIG. 9B) with no previous injection C is executed in the case that the main clutch 233 is in the power disconnection state. In this case, as shown by the flow chart in FIG. 10, the ECU 11 reads a detection value of the main clutch sensor 300 (S01), and discriminates on the basis of the detection value whether or not the main clutch 233 is in the power connection state (S02). In the case that the main clutch 233 is in the power connection state (S02: YES), the normal fuel injection control with the previous injection C is executed by the common rail device 117 (S03). In the case that the main clutch 233 is in the power disconnection state (S02: NO), the corrected fuel injection with no previous injection C is executed by the common rail device 117 (S04). After the steps S03 and D04, the control is carried on by returning to the step S01 until a key switch (not shown) for applying the power supply is turned off.

Figure 11:
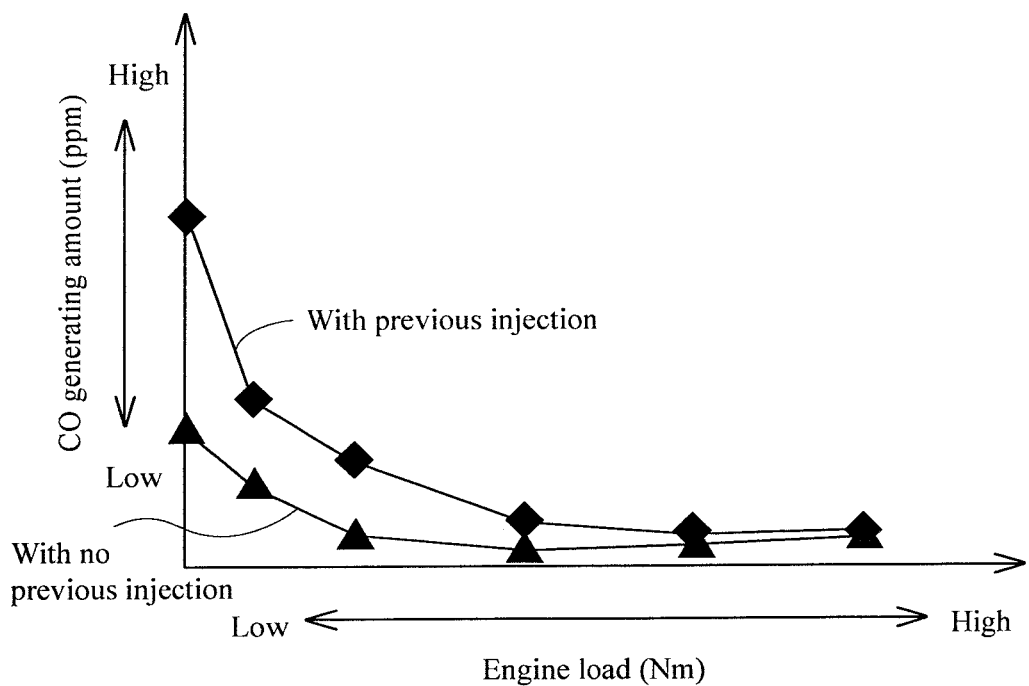
FIG. 11 is a graph showing a relationship between an engine load (an axial torque) and a CO generating amount.

According to the control mentioned above, at the low load driving time under the state in which the main clutch 233 is power disconnected, it is possible to omit the previous injection C regardless of the level of the rotating speed of the engine 70 and to reduce a risk that the defective ignition and the defective combustion are caused. As a result, it is possible to reduce the amount of the carbon monoxide (CO) in the exhaust gas and to avoid the problem that the white smoke is generated in the case that the engine 70 is driven under the low load. FIG. 11 shows a relationship between the load (the axial torque) of the engine 70 and the CO generating amount in the case that the engine 70 is rotated at a high speed (constant 250 rpm) by a graph, employs the load (the axial torque, Nm) of the engine 70 as a horizontal axis, and employs the CO generating amount (ppm) in the exhaust gas as a vertical axis. In the graph in FIG. 11, black triangles (▲) correspond to the case of the first example in which the previous injection C is not carried out at the low load driving time, and black squares (■) correspond to the conventional case that the previous injection C is carried out at the low load driving time. As is apparent from these results, the CO generating amount of the first example which does not carry out the previous injection C becomes equal to or less than one half of the conventional one, in the low load state in which the axial torque is small.

In the first example, only the previous injection C is employed as the prior injections B and C, however, only the pilot injection B may be employed as the prior injections B and C so as to set such that the previous injection C is not carried out at all regardless of the level of the load of the engine 70, in place of the first example.

Figure 12:
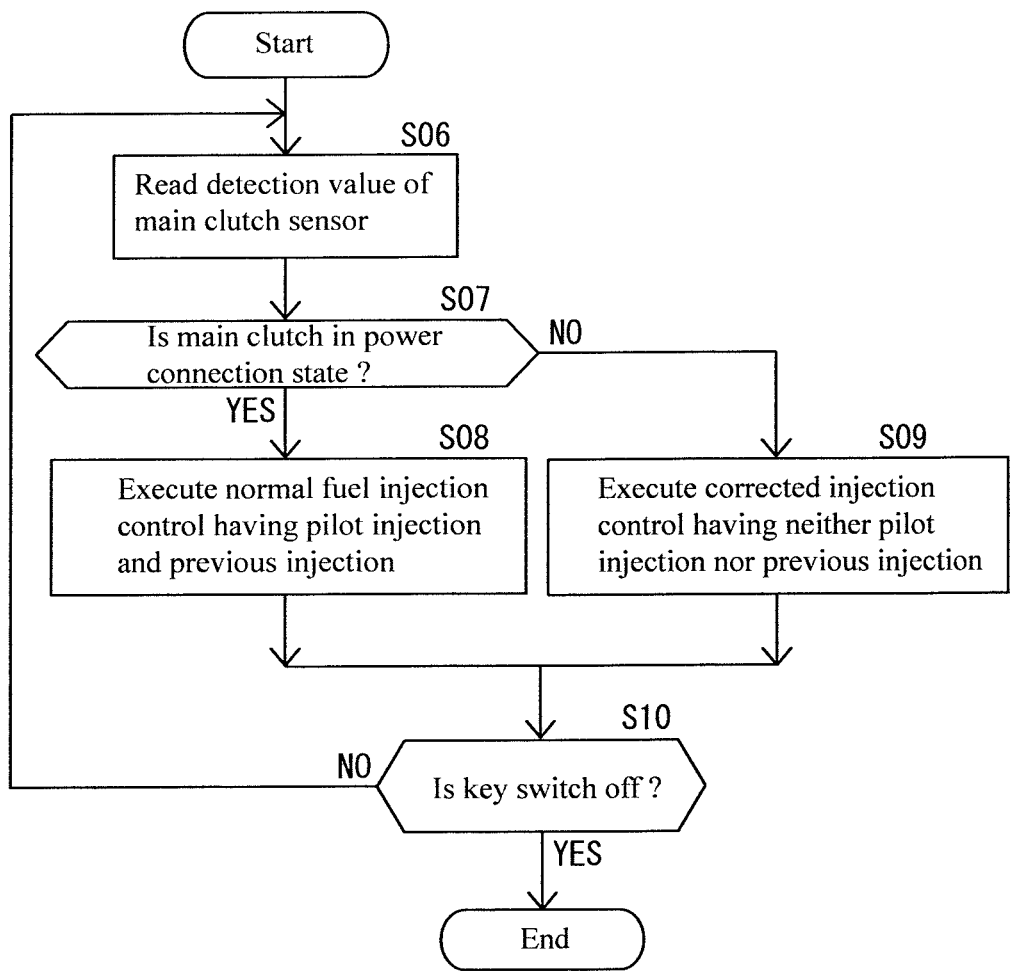
FIG. 12 is a flow chart showing a second example of the fuel injection control.

A flow chart in FIG. 12 is a second example of the fuel injection control. In the second example, both of the pilot injection B and the previous injection C are employed as the prior injections B and C. Further, in the case that the main clutch 233 is in the power connection state, the normal fuel injection control (refer to FIG. 9C) having both the pilot injection B and the previous injection C is executed, and in the case that the main clutch 233 is in the power disconnection state, the corrected injection control (refer to FIG. 9D) having neither the pilot injection B nor the previous injection C is executed. In this case, the flow chart in FIG. 12 is basically the same as the case in FIG. 10, however, both of the pilot injection B and the previous injection C are executed in the normal fuel injection control, and both the pilot injection B and the previous injection C are inhibited in the corrected injection control.

The second example is set such that both the pilot injection B and the previous injection C are employed as the prior injections B and C, and both the pilot injection B and the previous injection C are inhibited in the case that the engine 70 is driven at the low load, however, it is possible to set such that any one of the pilot injection B and the previous injection C is inhibited in the case that the engine 70 is driven at the low load, without being limited to this.

In the first example and the second example, the injection amount in the prior injections B and C (the injection amount of the previous injection C or sum of the injection amounts of the pilot injection B and the previous injection C) at the normal injection controlling time can be said to correspond to the previously set prescribed amount. In the first example and the second example, the injection amount in the prior injections B and C at the corrected injection controlling time is made less than that at the normal fuel injection controlling time (less than the prescribed amount) by omitting the previous injection C (setting the previous injection C to zero), however, the injection amount itself in the previous injection C and the pilot injection B may be respectively reduced, without being limited to this. In the case mentioned above, it is possible to reduce a risk that the defective ignition and the defective combustion are caused and to reduce the amount of the carbon monoxide in the exhaust gas.

Figure 13:
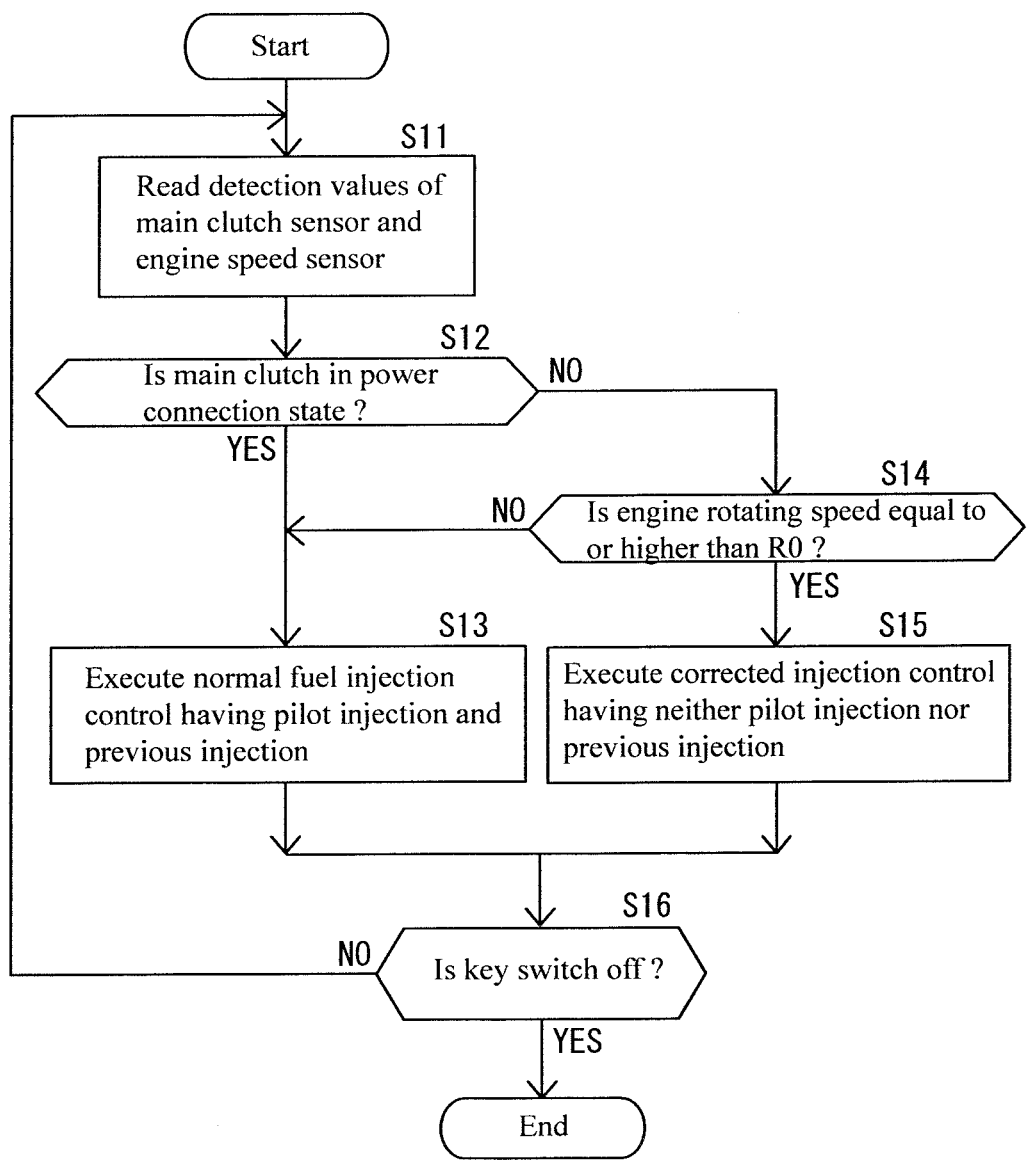
FIG. 13 is a flow chart showing a third example of the fuel injection control.

A flow chart in FIG. 13 is a third example of the fuel injection control. In the third example, both of the pilot injection B and the previous injection C are employed as the prior injections B and C, in the same manner as the second example. Further, in the case that the main clutch 233 is in the power connection state, the normal fuel injection control (refer to FIG. 9C) having both the pilot injection B and the previous injection C is executed, and in the case that the main clutch 233 is in the power disconnection state and the engine speed sensor 14 serving as the rotating speed detecting means detects the rotating speed which is equal to or higher than a previously set predetermined rotating speed R0, the corrected injection control (refer to FIG. 9D) having neither the pilot injection B nor the previous injection C is executed.

In this case, as shown in the flow chart in FIG. 13, the ECU 11 reads the detection values of the main clutch sensor 300 and the engine speed sensor 14 (S11), and discriminates on the basis of the detection value of the main clutch sensor 300 whether or not the main clutch 233 is in the power connection state (S12). If the main clutch 233 is in the power connection state (S12: YES), the ECU 11 makes the common rail device 117 execute the normal fuel injection control having both the pilot injection B and the previous injection C (S13). If the main clutch 233 is in the power disconnection state (S12: NO), the ECU 11 discriminates on the basis of the detection value of the engine speed sensor 14 whether or not the engine rotating speed is equal to or higher than the predetermined rotating speed R0 (S14). If the engine rotating speed is lower than the predetermined rotating speed R0 (S14: NO), the ECU 11 changes the step to the step S13, and makes the common rail device 117 execute the normal fuel injection control. If the engine rotating speed is equal to or higher than the predetermined rotating speed R0 (S14: YES), the ECU 11 makes the common rail device 117 execute the corrected fuel injection having neither the pilot injection B nor the previous injection C (S15). After the steps S13 and S15, the step goes back to the step S11 so as to carry on the control until a key switch (not shown) for applying the power supply is turned off. It is sufficient that the predetermined rotating speed R0 is set roughly, for example, to 1200 rpm.

According to the control mentioned above, it is possible to accurately inhibit the prior injections B and C at the high speed rotation and low load driving time which tends to cause the defective ignition and the defective combustion by executing the prior injections B and C, in the engine 70, and it is possible to securely suppress the amount of the carbon monoxide (CO) in the exhaust gas. Therefore, the effect of preventing the white smoke from being generated at the high speed rotation and low load driving time of the engine 70 is high.

Figure 14:
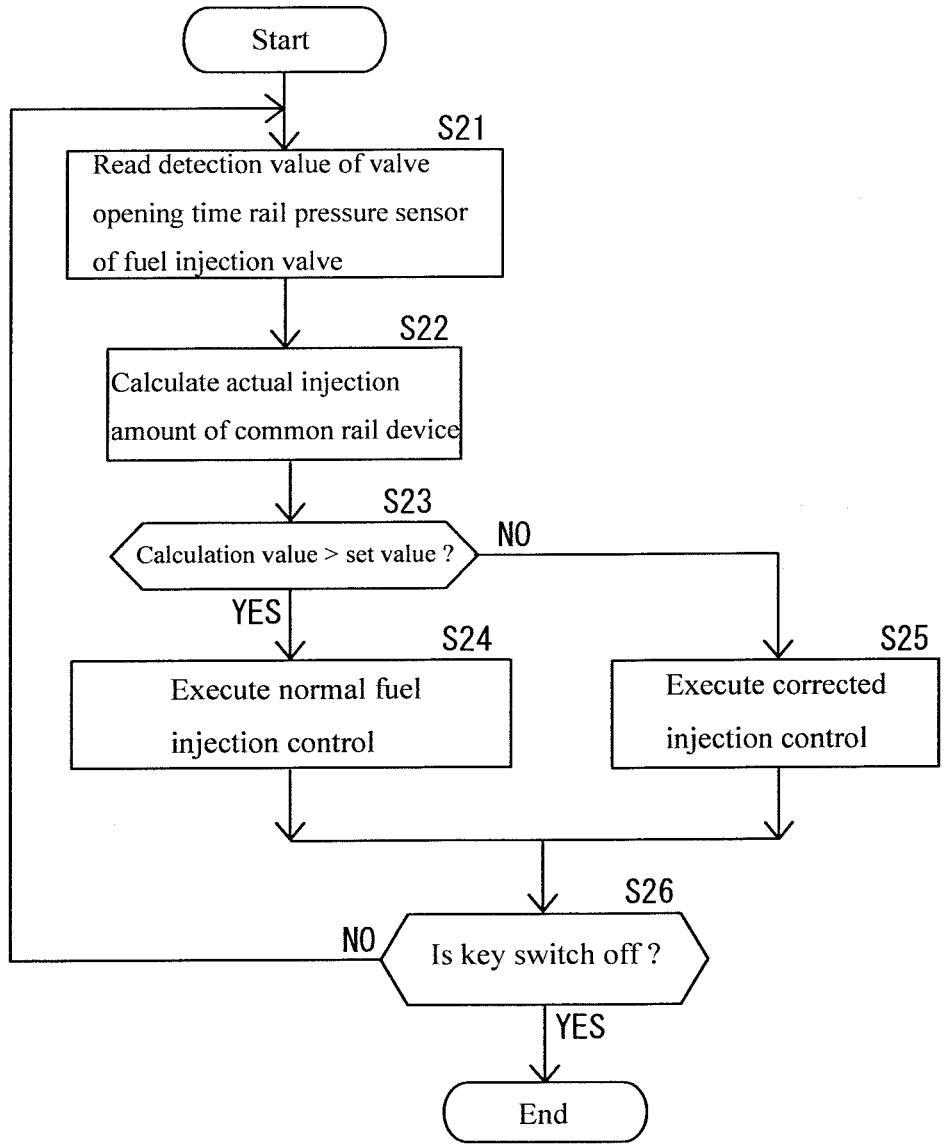
FIG. 14 is a flow chart showing a fourth example of the fuel injection control.

A flow chart in FIG. 14 is a fourth example of the fuel injection control. In the fourth example, an actual injection amount of the common rail device 117 which is calculated by the ECU 11 is used for discriminating the state of the load applied to the engine 70. In this case, as shown in the flow chart in FIG. 14, the ECU 11 reads the valve opening period of each of the fuel injection valves 119 and the detection value (the fuel pressure) of the rail pressure sensor 12 (S21), and calculates an actual injection amount injected by the common rail device 117 (an injection amount of a whole of the injector 115) (S22). Since the calculation value (the actual injection amount) corresponds to the load of the engine 70, the normal fuel injection control is executed by the common rail device 117 (S24) in the case that the calculation value is larger than the previously set value (S23: YES). If the calculation value is equal to or less than the set value (S23: NO), the corrected injection control is executed by the common rail device 117 (S25). The set value means a boundary value which indicates the low load state (for example, the case that the main clutch 233 is turned off) which is lower than that of the working time by the tractor 141. After the steps S24 and S25, the step goes back to the step S11 so as to carry on the control until the key switch (not shown) for applying the power supply is turned off. The fourth example may be set such as to inhibit at least one of the pilot injection B and the previous injection C at the low load driving time of the engine 70.

As is known from the above description, according to the engine device of the embodiment, the engine device is provided with the engine 70 which is mounted to the working vehicle 141, and the common rail type fuel injection device 117 which injects the fuel to the engine 70 at the multiple stages during one fuel cycle, and the common rail type fuel injection device 117 does not execute the prior injections B and C which are prior to the main injection A, in the low load state in which the load applied to the engine 70 is lower than that of the working time by the working vehicle 141. Accordingly, in the case that the engine 70 is driven at the low load, it is possible to omit the prior injections B and C regardless of the level of the rotating speed of the engine 70 and to reduce the risk that the defective ignition and the defective combustion are caused. As a result, it is possible to reduce the amount of the carbon monoxide (CO) in the exhaust gas and to avoid the problem that the white smoke is generated in the case that the engine 70 is driven at the low load.

Further, since the common rail type fuel injection device 117 executes the prior injections B and C as long as the load applied to the engine 70 is in the other states than the low load state, it is possible to secure the effect of the NOx reduction and the noise reduction by the prior injections B and C, while inhibiting the white smoke from being generated in the case that the engine 70 is driven at the low load.

Further, the engine device is further provided with the main clutch 233 which connects and disconnects the power transmission from the engine 70, and the common rail type fuel injection device 117 does not execute the prior injections B and C in the case that the main clutch 233 is in the power disconnection state. Accordingly, it is possible to easily prevent the problem that the white smoke is generated in the case that the engine 70 is driven at the low load, on the basis of the simple control obtained by combining the power connection and disconnection state of the main clutch 233 and possibility of the prior injections B and C.

Particularly, in the first example and the second example, the engine device is further provided with the connection and disconnection detecting means 300 which detects the power connection and disconnection state of the main clutch 233, and the common rail type fuel injection device 117 decides whether or not the prior injections B and C can be executed based on the result of detection of the connection and disconnection detecting means 300. In this case, the power disconnecting operation of the main clutch 233 is executed by the operator riding on the working vehicle 141, for example, by stepping down the clutch pedal 192. It is understood that the change of the engine 70 sound and the engine 70 drive feeling are caused by whether or not the prior injections B and C are executed, however, the change is generated due to the operation by the operator. Therefore, an uncomfortable feeling is not given to the operator.

Further, in the third example, the engine device is further provided with the rotating speed detecting means 14 which detects the engine rotating speed, and the common rail type fuel injection device 117 does not execute the prior injections B and C in the case that the connection and disconnection detecting means 300 detects the power disconnection state of the main clutch 233 and the engine rotating speed detected by the rotating speed detecting means 14 is equal to or higher than the predetermined rotating speed R0. Accordingly, it is possible to accurately inhibit the prior injections B and C at the high speed rotation and low load driving time which tends to cause the defective ignition and the defective combustion by executing the prior injections B and C, in the engine 70, and it is possible to securely suppress the amount of the carbon monoxide (CO) in the exhaust gas. Therefore, the effect of preventing the white smoke from being generated at the high speed rotation and low load driving time of the engine 70 is high.

Further, in the fourth example, the engine device is further provided with the injection amount detecting means 11 which detects the injection amount of the common rail type fuel injection device 117, and the common rail type fuel injection device 117 decides whether or not the prior injections B and C can be executed based on the result of detection of the injection amount detecting means 11. Accordingly, the prior injections B and C can be executed or not be executed appropriately based on the load state of the engine 70, and there can be achieve an effect that it is possible to accurately prevent the defective ignition and the defective combustion and to securely cope with the problem that the white smoke is generated in the case that the engine 70 is driven at the high speed rotation and low load.

(7) Others

The present invention is not limited to the embodiments mentioned above, but can be embodied into various aspects.

The structure of each of the portions is not limited to the illustrated embodiment, but can be variously changed within a range which does not deviate from the scope of the present invention.

REFERENCE SIGNS LIST

- 11 ECU (control means, injection amount detecting means)
- 14 rotating speed detecting means
- 70 engine
- 117 common rail device (common rail type fuel injection device)
- 120 common rail
- 141 tractor (working vehicle)
- 142 travel machine body
- 192 clutch pedal
- 233 main clutch
- 300 main clutch sensor (connection and disconnection detecting means)

The invention claimed is:

1. An engine device comprising:
   an engine being mounted to a working vehicle; and
   a common rail type fuel injection device for injecting fuel to the engine at multiple stages during one combustion cycle,
   wherein the common rail type fuel injection device makes an injection amount of a prior injection coming before a main injection less than a previously set prescribed amount in the case that a load applied to the engine is in a low load state in which a load is lower than that at a working time by the working vehicle.

2. The engine device according to claim 1, wherein the common rail type fuel injection device sets an injection amount of the prior injection to the prescribed amount in the case that the load applied to the engine is in the other state than the low load state.

* * * * *